USOO5474453A

United States Patent [19]
Copperman

[11] Patent Number: 5,474,453
[45] Date of Patent: Dec. 12, 1995

[54] SCENARIO DEVELOPMENT SYSTEM FOR VEHICLE SIMULATORS

[75] Inventor: Norman S. Copperman, Palo Alto, Calif.

[73] Assignee: Atari Games Corporation, Milpitas, Calif.

[21] Appl. No.: 18,951

[22] Filed: Feb. 17, 1993

[51] Int. Cl.⁶ .................................................. G09B 9/04
[52] U.S. Cl. ................... 434/29; 434/62; 434/65; 434/69; 273/85 R; 273/86 R; 273/433; 273/434
[58] Field of Search .................. 434/29, 62, 69, 434/65, 307 R; 273/85 R, 86 R, 433, 434, 438, 437, 442, 445; 364/410

[56] References Cited

U.S. PATENT DOCUMENTS

| | | |
|---|---|---|
| 4,182,053 | 1/1980 | Allen et al. . |
| 4,384,338 | 5/1983 | Bennett . |
| 4,714,428 | 12/1987 | Bunker et al. . |
| 4,750,888 | 6/1988 | Allard et al. . |
| 4,811,245 | 3/1989 | Bunker et al. . |
| 4,952,152 | 8/1990 | Briggs et al. ............................ 434/69 |
| 4,985,854 | 1/1991 | Wittenburg . |
| 5,005,148 | 4/1991 | Behensky et al. . |
| 5,021,772 | 6/1991 | King et al. . |
| 5,184,956 | 2/1993 | Langlais et al. ...................... 434/62 X |
| 5,269,687 | 12/1993 | Mott et al. ............................... 434/69 |
| 5,354,202 | 10/1994 | Moncrief et al. . |
| 5,366,376 | 11/1994 | Copperman et al. . |

FOREIGN PATENT DOCUMENTS

| | | | |
|---|---|---|---|
| 4221558 | 2/1993 | Germany | 434/61 |
| 2256568 | 12/1992 | United Kingdom . | |
| 0497327A2 | 1/1992 | WIPO . | |
| WO9202917 | 2/1992 | WIPO . | |
| 0483991A2 | 5/1992 | WIPO . | |

Primary Examiner—Richard J. Apley
Assistant Examiner—Glenn E. Richman
Attorney, Agent, or Firm—Knobbe, Martens, Olson & Bear

[57] ABSTRACT

A vehicle simulator containing a system for development of vehicle simulation scenarios. The vehicle simulation system includes simulated vehicle controls providing input signals to a computer, and feedback devices, including a video display, providing a user feedback on the operation and location of the simulated vehicle as it is driven through a simulated universe. One aspect of the invention is a scenario development system which uses the vehicle controls, the computer and the output devices to enable a scenario developer develop a simulation scenario which includes other programmed vehicles. The scenario developer can determine when and where the other programmed vehicles become active in a simulated universe in which the scenario takes place, as well as determine when and where the programmed vehicles leave the simulated universe. The scenario developer can also program the path of the programmed vehicles through the simulated universe by simply driving the programmed vehicles through the simulated universe using the vehicle controls and the feedback devices on the path that the scenario developer wishes the programmed vehicle to appear.

49 Claims, 18 Drawing Sheets

Microfiche Appendix Included
(1 Microfiche, 44 Pages)

"SCENARIO_TIMER"

"UPDATE SCENARIO"

"TO_PLACE_START"

"PROGRAM_VEHICLE"

"TO_PROGRAM_OBSERVE"

"CREATE_AND_PROGRAM"

"RUN_TIMER"

PLAY MENU

SCENARIO PATH TIME USED: 0:10:54

SCENARIO PATH TIME AVAILABLE: 3:54:11

SCENARIO END TIME 0:03:21

NUMBER OF PATHS 9

| PLAY SCENARIO |
| SCENARIO START TIME: 00:00 |
| VIEW: STUDENTS EYE VIEW |
| RABBIT SPEED IS: ADJUSTING |
| STUDENT VEHICLE; CRUISER |
| WEATHER: CLEAR |

FIG. 16

SCENARIO DEVELOPMENT SYSTEM FOR VEHICLE SIMULATORS

MICROFICHE APPENDIX

A microfiche appendix containing computer source code is attached. The microfiche appendix comprises one sheet of microfiche with a total of 44 frames, including one title frame.

The microfiche appendix contains material which is subject to copyright protection. The copyright owner has no objection to the reproduction of such material, as it appears in the files of the Patent and Trademark Office, but otherwise reserves all copyright rights whatsoever.

BACKGROUND OF THE INVENTION

1. Background of the Invention

The present invention generally relates to vehicle simulators and, more particularly, is concerned with a scenario development system for a vehicle simulator.

2. Background of the Invention

A vehicle simulator can be defined as a system that simulates the operating conditions of a vehicle in an environment. Typically, the simulator will include all of the controls that the vehicle being simulated would have and the simulator will try to simulate the operation of the vehicle as it would operate in the real world. For example, if the vehicle being simulated was an automobile, the simulator would typically include controls such as a steering wheel, a gear shift, brakes, and an accelerator, and the automobile would be simulated in an environment which would typically include a road.

Vehicle simulators provide the means to efficiently train operators of the vehicle without exposing the operator to the dangers associated with operating the vehicle in the real world. The simulator permits the operator to experience how the vehicle will operate in a given situation including those situations where the vehicle would otherwise be damaged like, for example, when the operator makes a mistake in his handling of the vehicle. The experience garnered though making mistakes on a simulator is invaluable when compared to the inherent risks of vehicle damage and operator injury associated with making a driving error in a real-life situation. As an example, in a police training application, a student could learn the limits of a police cruiser or guidelines for pursuing another vehicle, and be tested in these areas without any of the associated risks of real life training.

Nowadays, vehicle simulators are often implemented by using computers and computer driven video displays. Typically, these vehicle simulators includes the standard vehicle controls and instruments for a specific vehicle, as well as a video display which represents to the vehicle simulator operator the world outside of the vehicle he is operating. In these types of simulators, the computer generate a scenario which requires the operator to maneuver the vehicle within a simulated universe. Within this simulated universe, the computer will also generate specific events such as random traffic patterns, oncoming traffic, cars pulling away from curves, etc., to thereby give the operator the feeling of operating the vehicle in traffic and also to test the operator's ability to respond appropriately to the computer generated events.

A major shortcoming of these computer based simulators, as well as other types of simulators, is that the number of scenarios and events contained within the simulator is limited. As a consequence, operators of simulators, particularly students, will eventually repeatedly experience all of the events in the simulator. Once a student has seen the same scenario or event a repeated number of times, the educational value of continuing to operate the simulator is lessened.

An additional problem with presently known computer based simulators is that generally all of the scenarios and events are developed prior to use of the simulator. Often, the person developing the scenario is not a person who would be most knowledgeable about what types of scenarios and events should be included in the vehicle simulator to maximize its educational benefit. For example, a computer programmer may have some idea as to what scenarios and events should be included in an automobile simulator that is intended to train police officers to pursue other vehicles. However, the programmer is certainly not as knowledgeable about the types of events that are likely to occur during such a pursuit as is an experienced police officer. Consequently, the educational benefit derived from vehicle simulators will only be completely realized if the scenarios and events are as realistic as possible in that they closely approximate what the driver will actually experience in the real world.

Generally, the instructor who provides guidance for the student users of vehicle simulators is very knowledgeable about the scenarios and events that the student is likely to encounter in the real world. For example, the operation of a simulator designed to train police officers to correctly operate vehicles in a city environment will include instruction by an experienced police officer. While this training officer may be knowledgeable about what occurs in the real world, he will generally be unable to reprogram the simulator to be more realistic. This results from the fact that the computer programs which drive vehicle simulation systems typically are extremely complex, hence, changing the programming for the simulation to make it more realistic or even adding additional events or scenarios to the simulator is usually beyond the ability of most training officers.

Hence, there is a need for a vehicle simulator in which the set of scenarios and events can be continuously and easily modified. Additionally, there is a need for a simulator that permits a person, who is not an expert in computer programming, to develop additional scenarios and events to occur during the simulation.

SUMMARY OF THE INVENTION

To meet the aforementioned needs, the present invention includes a system and method for creating simulation scenarios in a vehicle simulation system that is easily programmed by an instructor or a user. Generally, the system can be implemented in any vehicle simulator requiring a specific simulation scenario involving other vehicles. The developer of the scenario can use the vehicle controls and the simulator display to define the characteristics and movements of a number of programmed vehicles in the simulated universe. Specifically, the system of the present invention permits a scenario developer to sit at the controls of the simulator, select a desired type of vehicle for a specific programmed vehicle to appear in a simulation scenario, view the simulated universe, and program the path of the vehicle in the simulated universe by manipulating the controls of the simulator to thereby drive the programmed vehicle through the simulated universe in the manner in which the developer wants it to appear.

In this fashion, the developer of the simulation scenario can program a specific event, e.g. a running an intersection, by simply driving a car through the intersection in the simulation universe. The developer can program repeated events in this fashion thereby developing an entire scenario comprised of multiple traffic events.

In one aspect of the present invention, the present invention includes a simulation system for training drivers to operate automobiles in traffic wherein the movements of other vehicles in the simulated universe are defined by an instructor. The instructor selects a type of automobile from a menu of automobile types, uses the simulator controls to drive the automobile to a position in the simulated universe, initiates a recording process, and drives the automobile through a simulation path that can be played back during simulation.

BRIEF DESCRIPTION OF THE DRAWINGS

FIG. 16 is a diagram of a play menu screen provided by the vehicle simulation system shown in FIG. 1.

DETAILED DESCRIPTION OF THE PREFERRED EMBODIMENTS

Reference is now made to the drawings wherein like numerals refer to like parts throughout. The vehicle simulation system, which includes a system for developing simulation scenarios, will initially be described. The description of the overall system will then be followed by a description of how this system will play a vehicle simulation for a user involving the user pursuing a pursued, or rabbit, vehicle through a simulated universe. The description of this simulation will then be followed by a description of how a vehicle simulation, including a pursuit type vehicle simulation, can be developed by a developer using the simulation system herein described. The manner in which the vehicle simulation system of the present invention stores the data programmed by the developer will then be described. It should be understood that the driver training system 100 as hereinafter described is applicable to any type of vehicle that is operated by a human. The present invention includes simulations which are easily generalized to driver training systems for all kinds of simulated vehicles and all types of driving.

I. SYSTEM OVERVIEW

Figure 1:
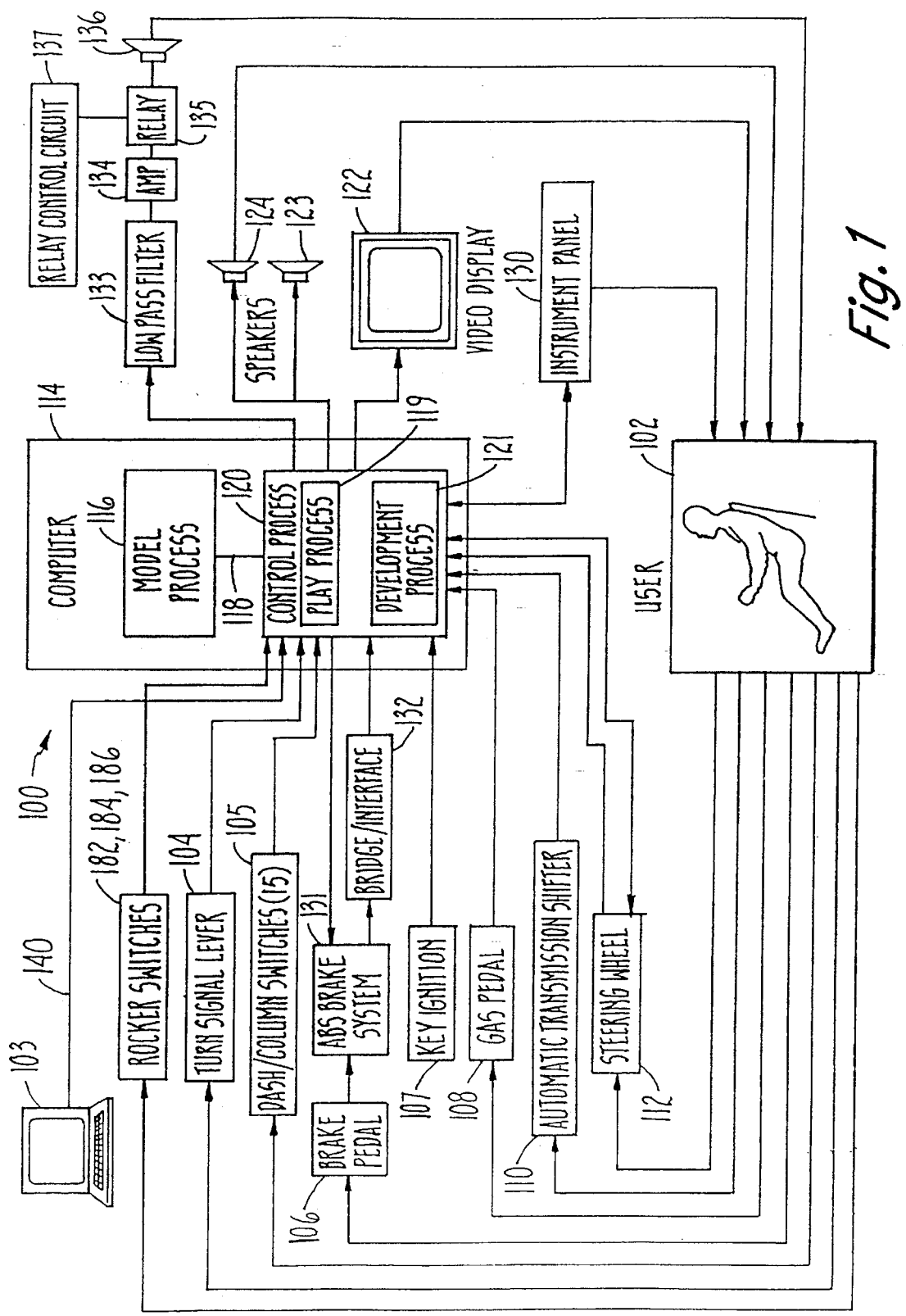
FIG. 1 is a block diagram of one presently preferred vehicle simulation system which includes a scenario development system of the present invention.

FIG. 1 shows one presently preferred embodiment of a driver training system 100 of the present invention. The driver training system 100 is operated by a user 102 (shown schematically), who desires to improve driving performance or by a simulation scenario developer who intends to develop a new scenario for the user 102.

The more specific embodiment of the driver training system 100 as presented in the following figures and description comprises a vehicle simulator for police training. Specifically, the vehicle simulator is used to train students to pursue or follow vehicles through a simulated universe. At times, the user 102 can be an instructor, the developer of the simulation scenario or a student.

In FIG. 1, the user 102 preferably sits in a booth or housing (not shown) such as the one described in the assignee's U.S. patent entitled "Rear Entry Booth and Adjustable Seat Apparatus for a Sit-Down Arcade Video Game", U.S. Pat. No. 4,960,117. In that way, distractions are minimized and the user 102 can concentrate on self-improvement of his driving technique.

In the driver training system 100, the user 102 moves a turn signal lever 104, manipulates a plurality of dash and column switches 105, manipulates a key turned ignition switch 107 for stating the simulated automobile, depresses a brake pedal 106 which is part of an ABS brake simulation system 131 and depresses a gas pedal 108 in the customary manner. In addition, an automatic transmission shifter 110 is manipulated by the user 102 to select a reverse gear or one of a plurality of forward gears. A steering wheel 112 is turned by the user 102 so as to guide the simulated vehicle in the desired direction of travel.

The mechanical inputs provided by the user 102 to the input devices 104, 105, 108, 110 and 112 are translated by transducers into electrical signals which are fed into a computer 114. The mechanical inputs on the brake pedal 106 are translated into electrical signals by the ABS brake system 131 and the signals are fed to a bridge interface circuit 132 connected to the computer 114. The computer 114 further receives both inputs and downloaded programs from a personal computer (PC) 103 which is preferably an IBM compatible computer having a 100 megabyte hard drive and a 4 megabyte RAM. The personal computer 103 and the computer 114 are interactively connected via a communication link 140. The link 140 should be capable of handling high speed digital data transmissions, on the order of 10 megabits per second, and it preferably uses a communications circuit such as an ADSP 2105 or 2101 manufactured by Analog Devices to ensure sufficiently rapid communication between the computer 114 and the personal computer 103.

In the presently preferred embodiment, the computer 114 includes a general purpose microprocessor such as a Motorola 68000 (not shown) or another member of the Motorola 680x0 microprocessor family. One function of the 68000 microprocessor is palette manipulation. In addition to the 68000 microprocessor, the computer 114 preferably includes a model processor (DSP), such as an AT&T DSP32C, a digital signal processor (ADSP), such as an Analog Devices ADSP-2101, and a graphics processor (GSP) such as a Texas Instruments 34010 Graphic System Processor, none of which are shown. The DSP performs velocity, acceleration, and position calculations. The ADSP provides the "higher-level" functions of video display such as translation, rotation, scaling, and shading while the GSP efficiently performs dither patterning, rendering, and the low-level graphics work of writing polygons (so-called polygon graphics) to the video display 122.

The presently preferred computer 114 also includes a read only memory (ROM) comprising 256 kilobytes of storage for self test; as well as a random access memory (RAM) comprising: 1.75 megabytes for downloaded programs, object definition data, and graphics universe data; an additional 0.5 megabytes of shared memory for additional downloaded graphics object data, shared with the 68000 processor. The center monitor in the video display 122 (FIG. 1) also includes an additional 1 megabyte of RAM for downloaded scenario traffic data. Furthermore, the presently preferred computer 114 also incorporates additional random access memories for each processor as follows: DSP-64 kilobytes; ADSP-12 kilobytes of program memory (for the programs downloaded from the programs downloaded from the computer RAM or the stand alone personal computer 103), 16 kilobytes of data memory and 8 kilobytes of buffer memory; and GSP - 45 kilobytes of program memory (for the programs downloaded from the RAM or the stand alone personal computer 103) and 640 kilobytes of display memory. The GSP employs video random access memory (VRAM) for improved video display rates.

The computer 114 executes scenario software which is stored in a memory (not shown) such as a 128kX 8, 70–100 nsec Random Access Memory (RAM). The scenario software can be one of a number of software scenarios, such as a pursuit simulation, stored within the PC 103 which can be downloaded into the computer 114 in response to commands executed at the PC 103. The computer software executed by the computer 114 is logically organized to include a control process 120. The control process is further organized into a scenario play process 119 and a scenario development process 121.

The control process 120 receives digitized signals from the input devices 104–112 as well as other digitized input signals from the personal computer 103 via the communications link 140. The control process 120 then passes data from these digitized signals, across a data path 118, to a model process 116 that models the velocity and acceleration vectors of the simulated car. Thus, at a time T, position data, i.e., the Cartesian coordinates of the car, are determined by the model process 116. The position data is made available, across the data path 118, back to the control process 120. Accordingly, the control process 120 applies the "rules of the road" to the new position of the car, and initiates signals to drive a video display 122, a pair of speakers 123 and 124, a low pass filter 133 and an instrument panel 130. The filter 133 provides a low pass filtered signal to an amplifier 134 which is connected to a relay 135, which in turn is connected to a speaker 136 positioned adjacent to a user's seat (not shown). The relay 135 is preferably a low voltage relay manufactured by Potter & Brumfield, model No. T70L5D, and is further coupled to a relay control circuit 137 which disconnects the speaker 136 when the system 100 is either powering up or down. The system comprising the components 133 through 137 provides the user 102 with road feel cues, such as the feeling of hitting a curb, and is described in the assignee's co-pending U.S. patent application entitled "Vehicle Simulator with Realistic Operating Feedback", filed concurrently herewith.

The play process 119 of the control process 120 will provide these output signals to the user 102 when the user 102 is engaged in the scenario. The development process 121 will provide these output signals to the developer when the developer is programming a vehicle to appear in the scenario by driving the programmed vehicle through the scenario. The development process 121 further utilizes the location information provided by the model process 116 to record the paths of the programmed vehicles that the developer has driven through the scenario.

The control process 120 further provides a user viewpoint into a graphical representation of the vehicle universe. In the preferred vehicle simulation embodiment, the computer 114 generates polygon graphics to the video display 122. One preferred video display device, such as model No. 25K7191 available from Wells-Gardner of Chicago, Ill., is a multi-synchronous display that can be configured to display 512× 384 pixels. The video display 122 may include a plurality of video devices arranged in a semi-circle to give the user 102 a simulated view similar to that of a real car. This arrangement is described in the assignee's co-pending U.S. patent application entitled "Modular Display Simulator" Ser. No. 07/704,373.

The video display 122 preferably generates a color, three-dimensional graphical representation of the environment, i.e., the user's perspective of a graphical universe including items such as a roadway. The speakers 123 and 124 produce sounds such as gear changes, engine revving, skidding, and so on. The instrument panel 130 includes a speedometer to indicate the speed of the simulated vehicle, an indicator for the gear selected by using the shifter 110, left and right arrow lights to indicate a direction selected by using the turn signal lever 104, and various other indicator lights. Thus, the user 102 is presented with real-time feedback from the output devices 122, 123, 124, 130 and 136 that is personalized according to his own individual performance and what he encounters in the simulated universe.

The control process 120 further provides feedback to simulate the feeling of a steering wheel in a real automobile while being driven. This is preferably accomplished in the same manner as described in assignee's patent entitled "Control Device such as a Steering Wheel for Video Vehicle Simulator With Realistic Feedback Forces", U.S. Pat. No. 5,044,956. In response to inputs from the ABS brake system 131 via a bridge interface circuit 132, the control process 120 also provides feedback to the brake pedal 106 via the ABS brake system 131. The system 131 simulates the brakes on an automobile equipped with an ABS braking system on the brake pedal 106 as described in the co-pending U.S. patent application entitled "Vehicle Simulator With Realistic Operating Feedback" filed concurrently herewith.

The basic operation of the simulator system 100 will now be described. A program containing a driving simulation scenario is downloaded from the personal computer 103 to the computer 114 which will execute the program. Pursuant to the programmed scenario, the computer 114 provides a graphics universe to be displayed to the user 102 via the video display 122 along with associated sounds via the speakers 123, 124. The user 102, in response to what he sees in the video display 122 and what he hears from the speakers 123, 124 manipulates the driving controls to thereby drive the simulated vehicle. Basically, the user 102 starts the automobile via the ignition switch 107, puts the automobile in gear via the automatic transmission sifter 110, depresses the gas pedal 108 to make the automobile move, depresses the brake pedal 106 to make the car stop and steers the automobile with the steering wheel 112.

In response to the user inputs provided via the input devices 104–112, the control process 120 of the computer 114 passes data to the model process 116 via the data path 118 which enable the model process 116 to model the velocity and acceleration vectors of the simulated vehicle thereby determining the Cartesian coordinates of the vehicle. This data is then passed back to the control process 120 via the data path 118 and is then used by the control process 120 to provide additional inputs to the user 102. For example, the Cartesian coordinates as determined by the model process 116 may determine that the user 102 has driven the simulated vehicle over a curb in the simulated universe, hence the control process 120 causes the speaker 123, 124 to generate an appropriate noise, cause the feeling of hitting a curb to be generated and felt by the user 102, via the low frequency speaker 136, as well as cause the steering wheel 112 to vibrate in the hands of the user 102 in response to hitting the curb. Further, the control process 120 will also provide feedback to the user 102 through the ABS brake system 131 when the user 102 applies the brakes sufficiently hard to enable the system.

From henceforth the specific embodiment described will be a police car simulator for vehicle pursuit training. However, it will be understood that the present invention includes, and is equally applicable to, other vehicle simulation systems.

In the particular embodiment of a pursuit training simulator, the user 102 is generally prompted by the computer 114 to follow a pursued or rabbit vehicle 150. Throughout this detailed description of the preferred embodiments section, the term pursued vehicle shall be used interchangeably with the term rabbit vehicle. During the course of the pursuit training simulation, the user 102 will have to respond to events generated by the program, such as oncoming traffic and the like.

Figure 2:
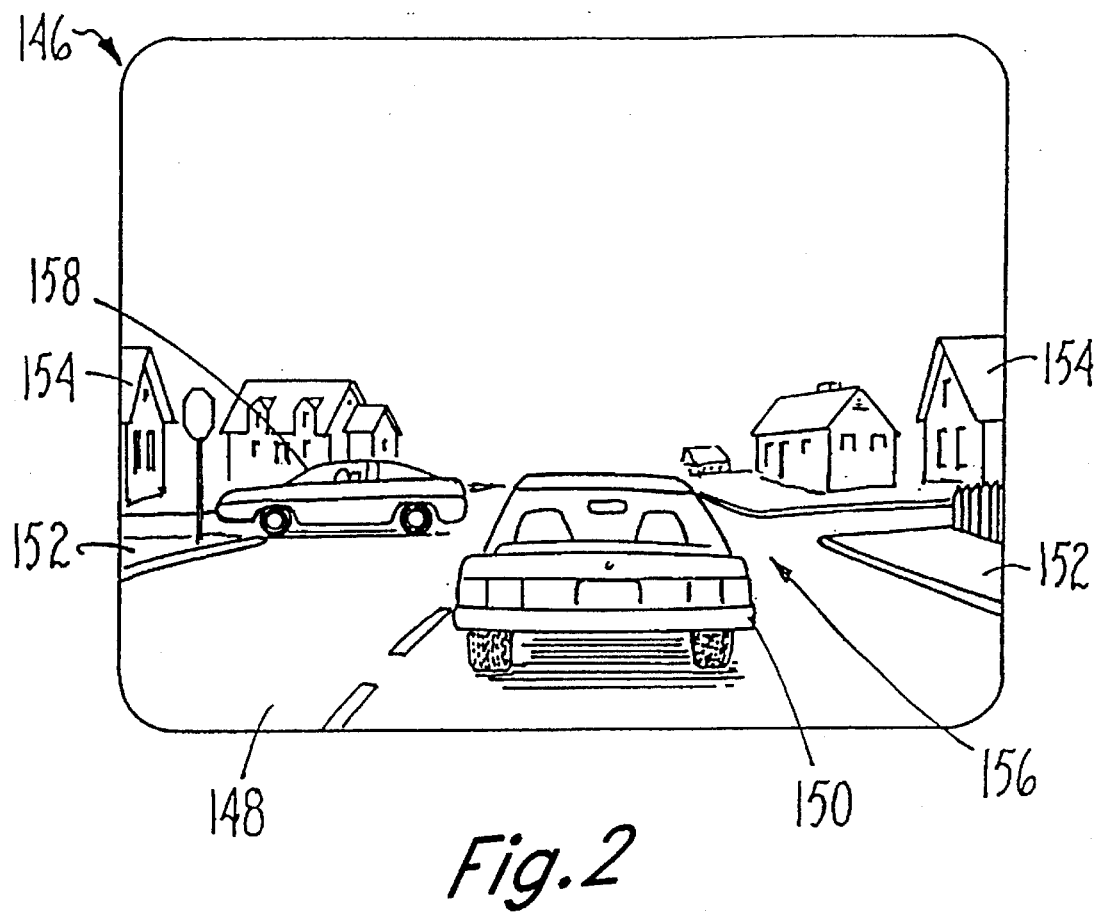
FIG. 2 is a user's view of a typical street scene corresponding to a video screen display provided by the vehicle simulation system of FIG. 1.

FIG. 2 is a diagram of a video screen display showing a typical pursuit scenario scene. From the first person viewpoint of FIG. 2, it is seen that the user 102 is "placed inside" of the vehicle being simulated. The developer of the scenarios developoped with this system in the manner described more fully below is similarly oriented when operating or programming a vehicle to appear in their simulation scenario. The user 102 views a three dimensional simulated graphical universe 146 as projected onto the two dimensional screen of the video display screen 122. The scene represented in FIG. 2 is one wherein the user 102 is looking forward through a windshield while driving the simulated vehicle and proceeding on a road 148 in the simulated universe 146 in pursuit of a pursued (or rabbit) vehicle 150. A sidewalk 152, a number of houses 154 as well other typical scenery seen in a suburban setting are located on either side of the road 148. As is shown in FIG. 2, the example simulated universe 146 also includes one or more intersections 156 which may contain one or more vehicles 158 as cross traffic.

As is further explained below, in one preferred embodiment of the present invention, the cross traffic vehicle 158 can be programmed by a scenario developer (not shown) using the simulation system controls and the video display 122 of the simulation system 100 shown in FIG. 1.

Figure 3:
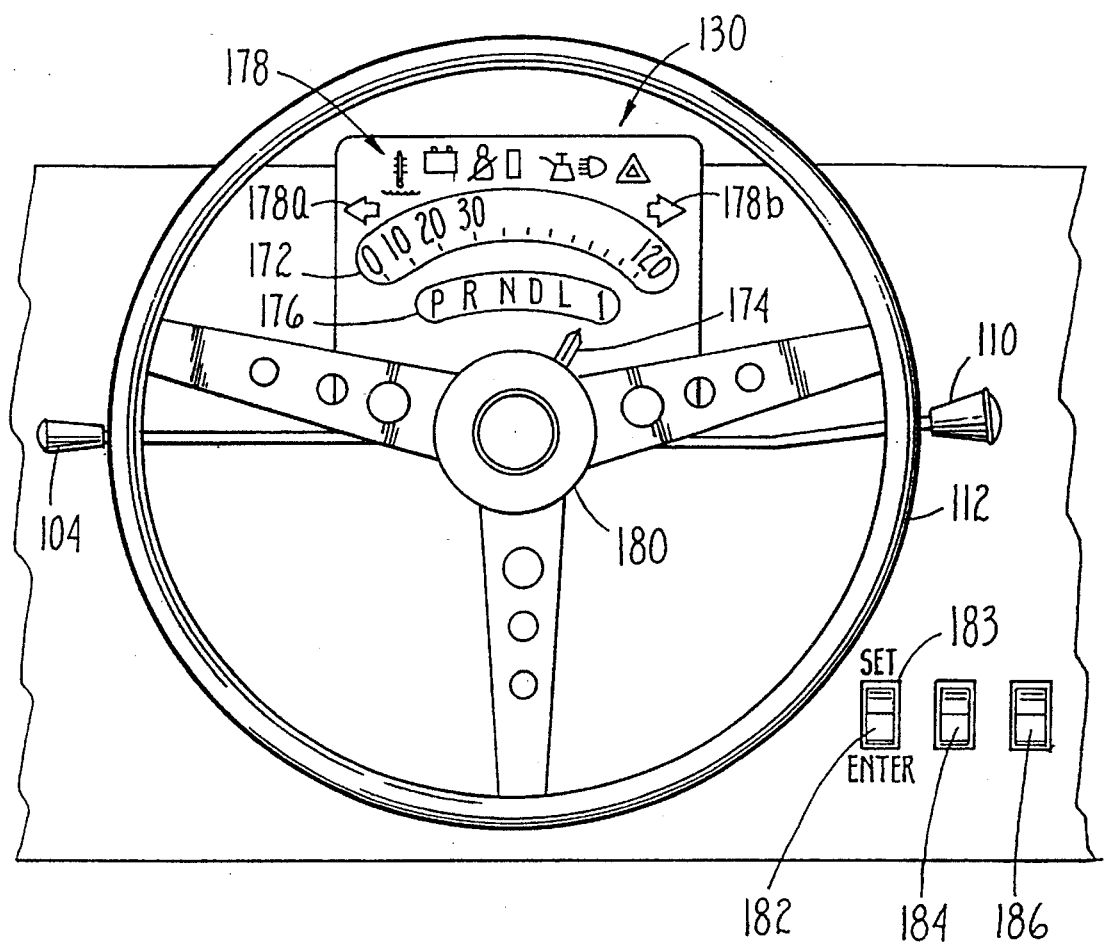
FIG. 3 is a diagram of a set of input devices and an instrument panel for the simulated vehicle of the vehicle simulator shown in FIG. 1.

The instrument panel 130 of the system 100, as shown in FIG. 3, includes a speedometer 172, a transmission gear indicator display area 174, a transmission gear indicator 176, a indicator and warning light area 178. Several input devices of the system 100, including the turn signal lever 104, the automatic transmission or shift lever 110, and the steering wheel 112, are also shown. The speedometer 172 and indicators become active when the user 102 (FIG. 1) "starts" the simulated vehicle. The speedometer 172 provides a measurement of velocity. The gear indicator 174 visually displays the position of the shift lever 110 upon the gear indicator display area 174. The indicator and warning light area 178 includes the following designators (left to right): left turn signal 178a, temperature, battery, seat belt, brake, oil pressure, high beam (headlights), emergency flasher, and right turn signal 178b. The turn signal lever 104 is mounted on a steering column housing 180. FIG. 3 also shows an enter rocker switch 182, a select rocker switch 184 and an abort rocker switch 186 mounted adjacent to the dashboard of the simulated vehicle. The switches 182, 184 permit the user 102 to select between various menu choices and the abort rocker switch 186 enables the user 102 (FIG. 1) to end a simulation while the simulation is running.

II. SIMULATOR OPERATION AFTER SCENARIO PROGRAMMING

To more fully explain the present invention, the operation of the simulation system 100 during the course of a previously programmed simulation scenario undertaken by the user 102 (FIG. 1) will now be described. This description will then be followed by a description of how the simulation system 100 can be used by a developer to develop a similar scenario to be used at a later time by the user 102.

Figure 4:
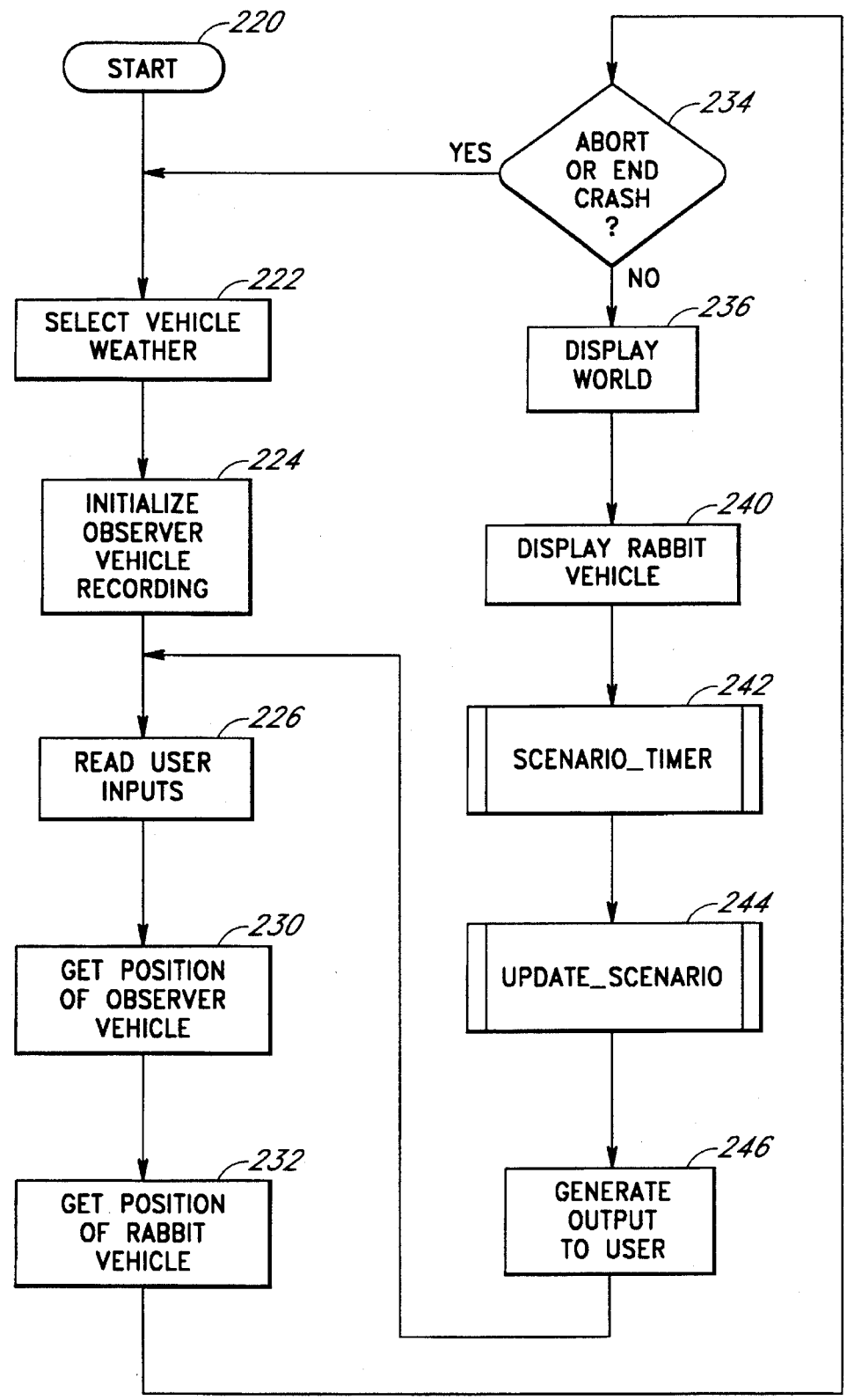
FIG. 4 is a flow diagram of a typical function forming a portion of the control process shown in FIG. 1, which performs a simulation scenario.

FIG. 4 is a flow diagram showing the top level function of the control process 120 (FIG. 1) during the course of a typical pursuit scenario. In one presently preferred embodiment, the control process 120 is written in the "C" language and cross-compiled using a Green Hills Software, Inc. "C" compiler available from Oasys, a division of Xel, Inc. of Waltham, Mass. The control process 120 is then executed on a Motorola 68000 microprocessor located in the computer 114. However, one skilled in the art of computers will recognize that many other computer languages and computers, including pluralities of each, may be used to achieve the same result. Computer source code of relevant portions of the control process 120 performing the top level function shown in FIG. 4 is entitled pursuit.c and is attached herewith in the accompanying Microfiche Appendix.

Prior to a start state 220, a scenario program is downloaded from the personal computer 103 to the computer 114. For example, the scenario program may be a scenario designed to train police officers to pursue vehicles through a simulated universe consisting of a suburban town. The user 102 (FIG. 1) then presses the enter rocker switch 182 (FIG. 3) which is one of a number of the column and dash switches 105 (FIG. 1). Moving to a state 222, the computer 114 (FIG. 1) directs the video display 122 to display a series of menus from which the user 102 may, depending on the scenario that is being run by the computer 114, select the type of vehicle he will drive, or the type of weather. The selection is accomplished by manipulating the rocker switches 182 or 184 (FIG. 3). Preferably, in some of the scenarios that are available to be downloaded from the computer 103, a series of default choices will be made for the type of vehicle and weather. After selections are made for vehicle and weather, if desired, or the default choices are accepted, the user 102 selects the "start scenario" option and then depresses one of the rocker switch 182 or 184 to signal the computer 114 to move to the next state.

Next, the computer 114 (FIG. 1) moves to a state 224 where the computer 114 will initiates a process by which the path followed by the pursuit vehicle in the upcoming scenario will be recorded. This recording can be played back at a later time to permit analysis and critique of the performance of the user 102 during the scenario. The computer 114 moves from the state 224 to a state 226 where it will read the inputs provided by the user 102 via the user input devices 104–112 (FIG. 1).

The computer 114 proceeds from state 226 to a state 230 where it determines the position in the simulation universe of the simulated vehicle containing the user 102, i.e., the observer vehicle. In the state 230, the computer 114 sends signals on the data path 118 to the model process 116 (FIG. 1) representative of the developer inputs on the input devices 104–112 (FIG. 1). The model process 116 processes the input signals and determines the Cartesian coordinates of the vehicle relative to a starting position within the simulated universe 146 (FIG. 2). The computer 114 then moves to a state 232 where it obtains the position of the pursued or "rabbit" vehicle 150 (FIG. 2) from memory. The position of the rabbit vehicle 150 was previously programmed and is dependent upon a scenario clock (not shown) as will described below.

The computer 114 then enters a decision state 234 where it determines whether the user 102 has crashed the vehicle, manipulated the abort rocker switch 186 (FIG. 3), or has reached the end of the scenario. If the computer 114 determines that the user 102 has crashed, aborted or completed the scenario, then the computer 114 returns to the selection state 222. If the computer 114 determines that the user 102 has not crashed, aborted or completed the scenario, then it moves to a state 236.

In the state 236, the computer 114 recalls the background scenario for the particular location of the observer vehicle, as given by the model process 118 in state 230, within the simulated universe 146 (FIG. 2) and causes it to be displayed on the video display 122 (FIG. 1). The display of the background scenario, as well as the display of the other objects to be discussed below, is performed by a digital signal processor (not shown) within the computer 114 (FIG. 1) such as an ADSP 2101 chip available from Analog Devices of Norwood Massachusetts. The background scenario can include the houses 154, sidewalks 152, and streets 148 as shown, for example, in FIG. 2.

The computer 114 then moves to a state 240 wherein the rabbit vehicle 150 (FIG. 2) is displayed via the video screen 122 in its position in the simulated universe 146 (FIG. 2) as determined in state 232. The computer 114 then performs a function 242 entitled "scenario_timer". In the function 242, the computer 114 updates a scenario clock. After performing the function 242, the computer 114 then performs a function 244 entitled "update_scenario" where it updates the display on the video display 122 (FIG. 1) of other vehicles programmed to appear in the simulation scenario. The functions 242, 244 will be discussed in more detail below with reference to FIGS. 5 and 6.

The computer 114 then preferably moves to a state 246 where it generates output signals to the user 102. These output signals consists of appropriate sounds, e.g. the sounds of a collision, tires screeching etc., via the speakers 123 and 124 (FIG. 1), appropriate road feel cues via the low frequency speaker 136, feedback on the brake pedal 106 via the ABS brake system 131, and feedback on the steering wheel 112.

The computer 114 then returns to the state 226 where it will read the inputs signals provided by the user 102 on the input devices 104–112 (FIG. 1). The computer 114 completes the loop comprising the states 226 through 246 sufficiently quickly to provide the user 102 with the feeling of fluid motion thereby enhancing the real world driving feeling while driving within the simulated universe 146.

Figure 5:
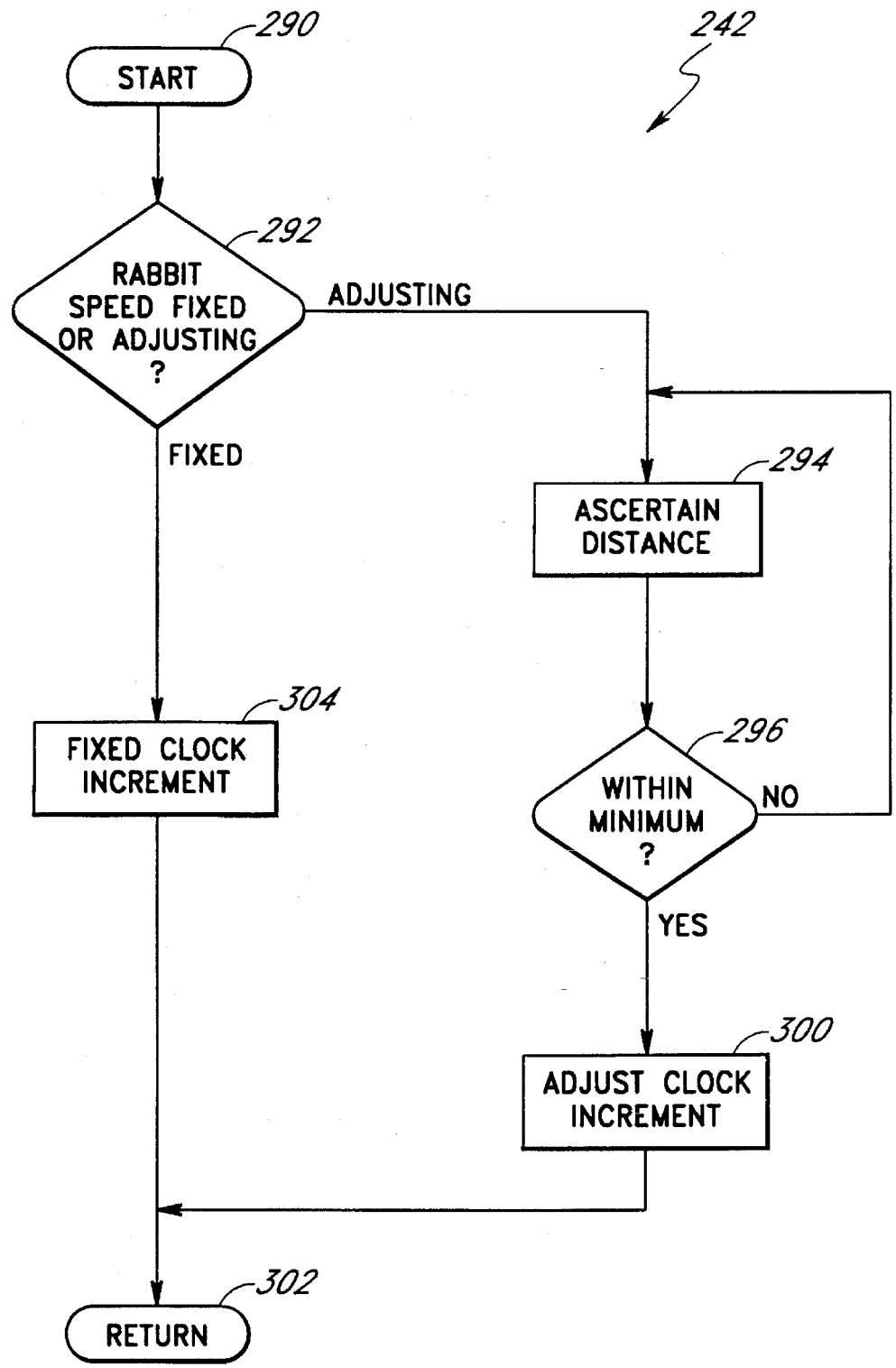
FIG. 5 is a flow diagram of the "scenario_timer" function shown in FIG. 4.

FIG. 5 shows a flow diagram for the "scenario_timer" function 242. The scenario clock is a clock which is tied to a 4 millisecond clock (not shown) which is part of the simulation system 100. As will be described in greater detail below, in this preferred embodiment of the invention, the position of the programmed vehicles, which comprise all of the vehicles within the simulated universe 146, other than the observer vehicle, is defined as a function of the scenario clock. These programmed vehicles are programmed to appear in the simulated universe 146 at a set time on the scenario clock, travel along a path where their location is updated at set intervals of the scenario clock, and then leave the simulated universe 146 at the programmed scenario clock time. Further, these programmed vehicles are stored within the memory of the computer 114, when the simulation scenario is running, sorted in terms of when they are to appear in the simulated universe.

Referring now to FIG. 5, the "scenario_timer" function 242 operates as follows. Beginning at a start state 290, the computer 114 enters a decision state 292 where it determines whether the speed of the pursued vehicle 150 has been selected to be fixed or variable. In this presently preferred embodiment of the invention, the speed of the pursued vehicle 150 (FIG. 2) can either be fixed at what the developer programmed the speed of the pursued vehicle to be, or the speed can adjust according to the distance between the pursued vehicle 150 and the observer vehicle. When the speed is set to be adjusting, the pursued vehicle will speed up as the observer vehicle gets closer, and it will slow down as the observer vehicle gets farther away.

In decision state 292, when the computer 114 determines that the speed of the pursued vehicle 150 is adjustable, the computer 114 moves to a state 294 where it ascertains the distance between the observer vehicle and the pursued vehicle 150. The computer 114 then proceeds to a decision state 296 where it determines whether the observer vehicle is within a pre-selected minimum distance of the pursued vehicle 150. If the computer 114 determines that the observer vehicle is not within the preselected distance, it returns from the decision state 296 to the state 294 to re-ascertain the distance between the observer vehicle and the rabbit vehicle 150 (FIG. 2).

If the computer 114 determines that the observer vehicle is within the preselected distance in decision state 296, the computer 114 then moves to a state 300 where it adjustably increments the scenario clock. In the state 300, the scenario clock will be incremented by a greater period of time than when the observer vehicle is close to the pursued vehicle 150 than it is when it is farther away.

The position of the programmed vehicles, programmed to be within the simulated universe 146, along their programmed paths is dependent upon the scenario timer, in that the computer 114 will update their position along their programmed paths to the position that they are programmed to be at the present time on the scenario time. Hence, as can be appreciated, if the scenario timer is incrementing at higher increments of time, these vehicles will appear in the video display 122 to the user 102 to be moving faster. After completing the incrementing of the timer in state 300, the computer 114 then moves to a return state 302.

If the computer 114 in decision state 292 determines that the speed of the pursued vehicle 150 (FIG. 2) is fixed then, the computer 114 proceeds to a state 304 where the scenario clock will be incremented by a fixed amount. This results in the programmed vehicles proceeding through the simulated universe 146 at their programmed speed.

Figure 6:
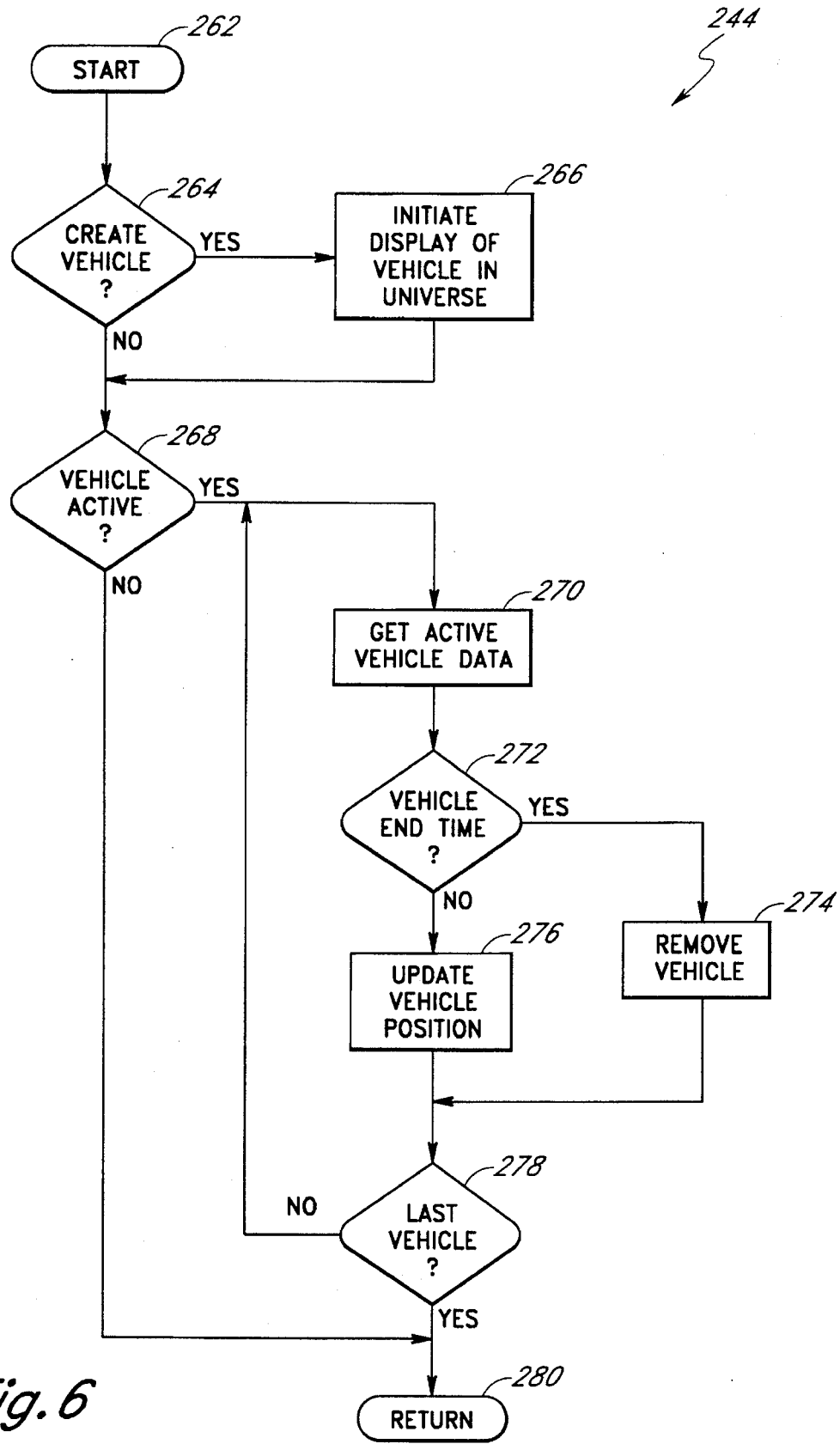
FIG. 6 is a flow diagram of the "update_scenario" function shown in FIG. 4.

FIG. 6 illustrates the flow diagram of the "update_scenario" function 244 shown in FIG. 4. From a start state 262 the computer 114 (FIG. 1) proceeds to a decision state 264 where the computer 114 determines whether any programmed vehicles are scheduled to be created at this time on the scenario clock. As will be described in greater detail below, the programmed vehicles are stored within the memory of the computer 114, when the scenario is running, sorted in terms of when, on the scenario time clock, they are to be created in the simulated universe 146. If the computer 114 determines in decision state 264 that a vehicle is scheduled to be created, the computer 114 proceeds to a state 266 where it initiates the display of the vehicle in the simulated universe 146 and then returns to the flow.

If the computer 114 determines decision state 264 that there is no programmed vehicle scheduled to be created in the simulated universe 146, the computer 114 then moves to a decision state 268 where it determines whether any of the programmed vehicles are currently active in the simulated universe 146. If the computer 114 determines that one or more programmed vehicles are currently active, the computer 114 proceeds from the decision state 264 to a state 270 where the path data and attributes of one of the programmed vehicle active in the simulated universe 146 at the current time is retrieved by the computer 114.

The computer 114 then proceeds to a decision state 272 where it determines whether the programmed vehicle is scheduled to be removed from the simulated universe 146 at this particular time. If the computer 114 determines that the programmed vehicle is scheduled to be removed from the simulated universe 146, the computer 114 moves to a state 274 where it removes the programmed vehicle. If the computer 114 determines that the programmed vehicle is not scheduled to be removed from the simulated universe 146, the computer 114 moves to a state 276 where it updates the programmed vehicle its proper position at the current scenario time as given by the path data for this programmed vehicle.

The computer 114 then proceeds to a decision state 278 where it determines whether this is the last programmed vehicle active in the simulated universe 146 that must be updated. If the computer 114 determines that this is the last programmed vehicle active, the computer 114 then moves to a return state 280. If the computer 114 determines that this is not the last vehicle active in the simulated universe 146, at the present time on the scenario clock, the computer returns to the state 270 where it will recall the data about the next active programmed vehicle in the simulated universe 146 at the present time on the scenario clock.

If, in decision state 268, the computer 114 determines that there are no active programmed vehicle in the simulated universe 146 at the current time on the scenario clock, the computer 114 will then proceed to the return state 280.

The source code, entitled pursuit.c which implements the above described simulation is included in the Microfiche Appendix. The function which carries out the above-described scenario timer clock functions is included in the pursuit.c source code and is entitled "scenario_timer".

III. PROGRAMMING A SCENARIO

One preferred embodiment of the system for developing a simulation scenario, including a pursuit simulation scenario like the type detailed above, will now be described. In this preferred embodiment, the developer of the scenario will sit in the simulation system 100 in the same manner as the user 102 (FIG. 1) does when the simulation is running. Further, the development of the simulation scenario by the scenario developer, e.g., police car driving instructor, will be accomplished using the vehicle input devices 104–112 (FIG. 1), a display of the simulated universe in the video display 122 (FIG. 1) as well as the rocker switches 182, 184, and 186 (FIG. 3). The developer process 121 of the computer 114 (FIG. 1) is activated in response to commands given at the keyboard of the personal computer 103. This permits the developer to begin developing a driving simulation scenario.

Included in the attached Microfiche Appendix is the source code entitled pursuit.c which implements the above describe pursuit simulation and the scenario development system of the presently preferred embodiment which will be described below. Functions described herein which appear in quotation marks, e g , "to_program_observe", are the names of the functions within the source code which perform the described operations.

Figure 7:
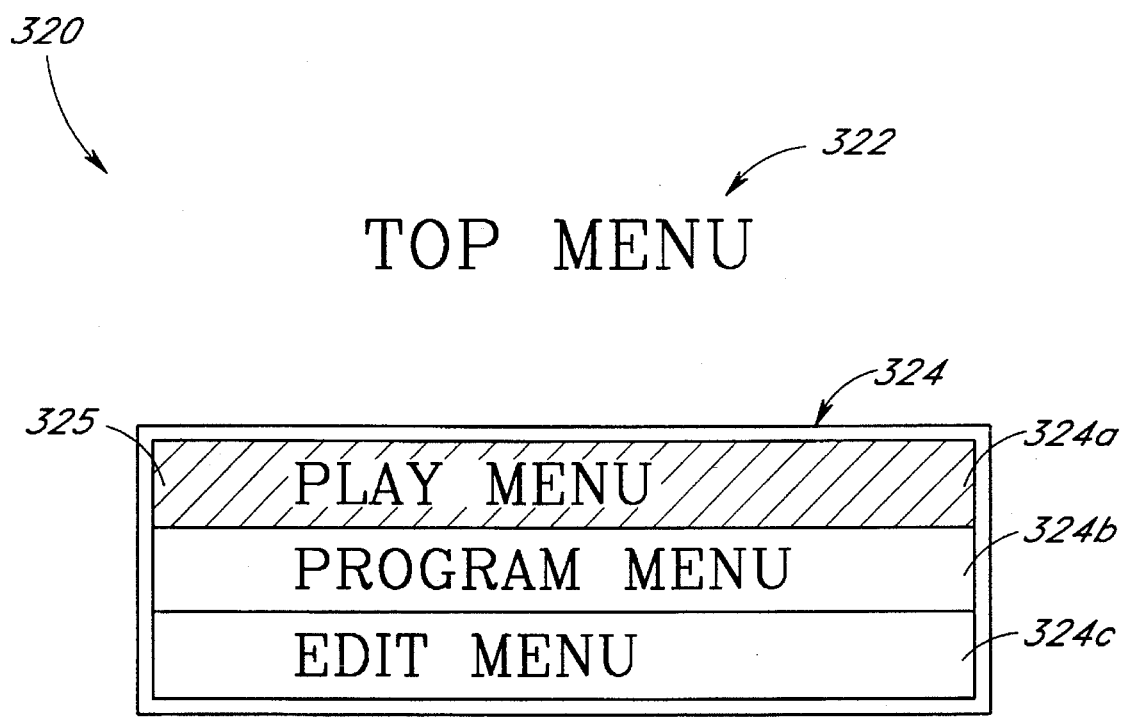
FIG. 7 is a diagram of a top menu screen provided by the vehicle simulation system shown in FIG. 1.

FIG. 7 illustrates a Top Menu 320. The Top Menu 320 is the first menu that is provided to the developer of the simulation scenario in this preferred embodiment. FIG. 7 illustrates that the Top Menu has a header portion 322 and a box portion 324. In the box portion 324, there is a Play Menu line 324a, a Program Menu line 324b, and an Edit Menu line 324c. The developer uses this menu to select the next menu containing options necessary to develop the scenario. The scenario developer selects between the lines 324a, 324b, and 324c by moving a shaded line 325 to the desired Menu line 324. The developer moves the shaded line between lines by pressing up or down on the select rocker switch 184. When the developer is then on the desired menu line, he then presses the enter rocker arm switch 182 to initiate the menu or function contained on that line. Preferably, this method of selecting between menu lines is the same method used for selecting between menu lines of all the menus herein described relating to this preferred embodiment. If the developer manipulates the abort rocker switch 186 (FIG. 3) at any time during the development of a simulation scenario, the computer 114 will return the developer to the Top Menu 320 by replacing the then existing display on the display screen 122, with a display of the Top Menu 320 as seen in FIG. 7. Included in the Microfiche Appendix is the source code entitled "smenus.c" which implements all of the menus herein described.

Figure 8:
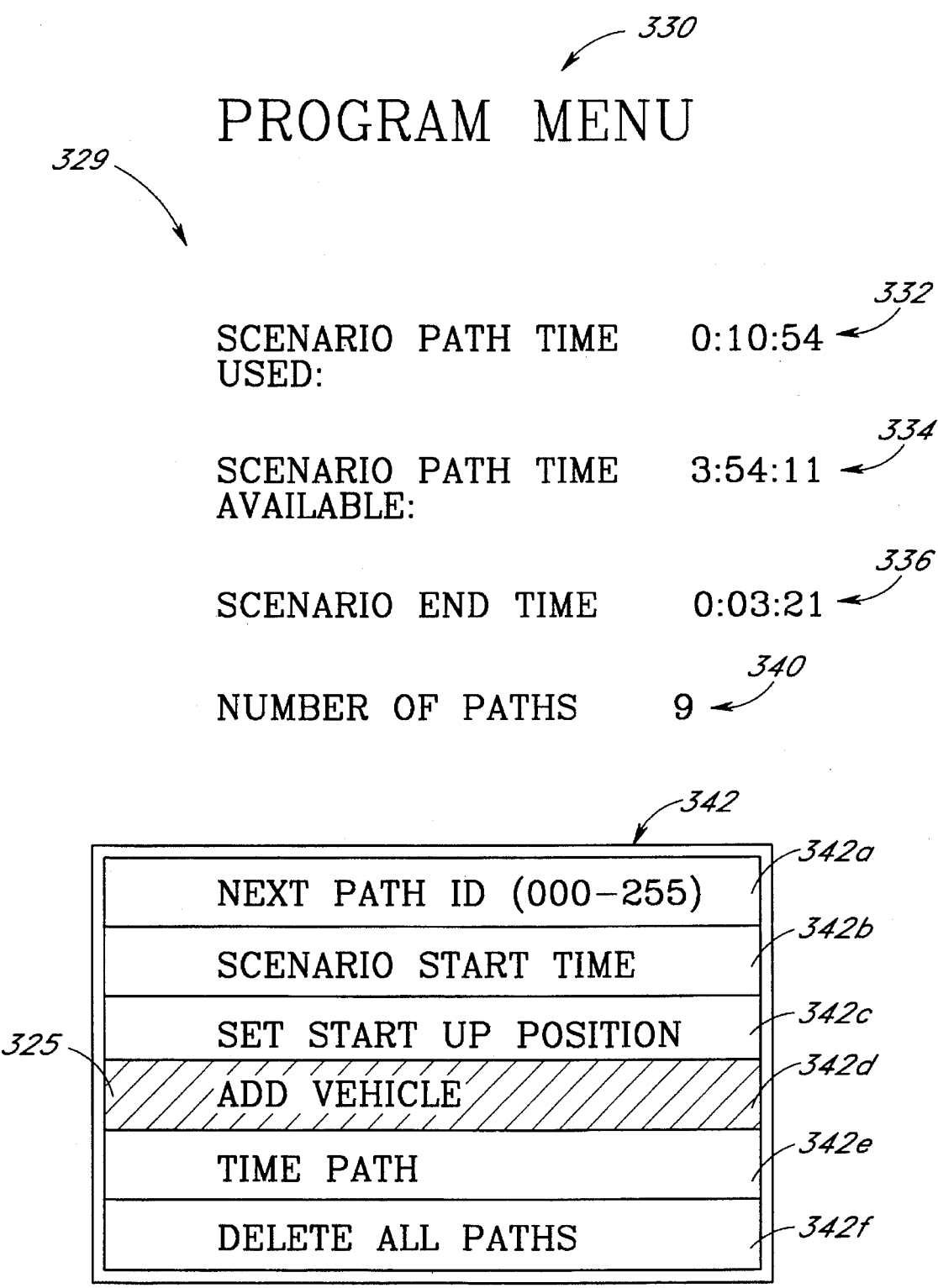
FIG. 8 is a is a diagram of a program menu screen provided by the vehicle simulation system shown in FIG. 1.

FIG. 8 illustrates a Program Menu 329 that the developer sees when the Program Menu line 324b of the Top Menu 320 (FIG. 7) is selected. From this menu, the developer is able to add vehicles to the scenario under development as well as set the starting position for the user 102 in the observer vehicle. The Program Menu 329 contains a header 330 identifying the menu, A Scenario Path Time Used header 332 which indicates how much of a limited amount of path time has been used thus far in developing the scenario, and a Scenario Path Time Available header 334 which indicates how much of the limited amount of path time is available for programming additional vehicles and vehicle paths.

The Scenario Path Time is the amount of time, according to the scenario time clock, that the developer can use to program the scenario. There is a finite amount of time that is available to the developer to be used to program a scenario. A Scenario End Time header 336 also gives the developer an indication of when, on the scenario time clock, the scenario is presently programmed to end. Further, a Number of Paths header 340 indicates to the developer the number of programmed vehicles and vehicle paths presently programmed into this particular scenario. In the presently preferred embodiment, there is a limit of 256 vehicles that can be programmed into any one simulation scenario. However, if additional memory space is provided in the computer 114, additional vehicle paths can be programmed into a specific simulation scenario.

FIG. 8 also illustrates a programming box 342 containing a Next Path ID line 342*a*, a Scenario Start Time line 342*b*, a Set Start Up Position line 342*c*, an Add Vehicle line 342*d*, a Time Path line 342*e*, and a Delete All Paths line 342*f*. The developer selects between these lines using the select and enter rocker switches 182 and 184 (FIG. 3) in the manner described above. The functions performed by the computer 114 when each of these lines 342*a* through 342*f* are selected will now be described.

If the scenario developer selects line 342*a*, he will be able to select the identification number of the next programmed vehicle and vehicle path he will program into the scenario. He can choose between the numbers 000 and 255 in this preferred embodiment. The developer programs the number by manipulating the select rocker switch 184 to select and display a number for the first digit, depressing the enter rocker switch 182 to save the selected number for this digit and to move to the next digit. This process is repeated until all of the digits have been programmed, at which time the computer 114 (FIG. 1) assigns the number to the next vehicle the developer programs into the scenario. If the developer does not select line 342*a* when he is programming in a new vehicle path, the computer 114 automatically assigns the next available identification number (000–255) to the programmed vehicle and vehicle path the developer programs.

If the developer selects the Scenario Start Time line 342*b*, the developer, when he is adding an additional programmed vehicle, will be able to add the additional programmed vehicle into the simulated universe 146 at the time he has specified on the Scenario Start Time line 342*b*, without having to replay the entire scenario from the beginning. The operation of the function called by the Scenario Start Time line 342*b* will be described in greater detail below in conjunction with the description of how the developer will add a programmed vehicle to the scenario via the Add Vehicle line 342*d*.

If the developer selects the Set Start Up Position line 342*c*, the developer will be able to set the location of where the observer vehicle, containing the user 102 (FIG. 1) will begin the simulation scenario when the developed scenario is played. The function called by the Set Start Up Position line 342*c* will be described in greater detail with reference to FIGS. 9 and 10 below.

If the developer selects the Add Vehicle line 342*d*, the developer will be able to add programmed vehicles to appear during the course of the scenario at specific locations in the simulated universe when it is being used by the user 102. With line 324*d*, the scenario developer can program the attributes that the programmed vehicles will have, when the programmed vehicle will be active i.e., created and existing in the simulated universe 146, and the path the programmed vehicle will follow when it is active in the simulated universe 146. The function called by the Add Vehicle line 342*d* will be described in greater detail with reference to FIGS. 10, 11 and 12 below.

If the scenario developer selects the Time Path line 342*e*, then the scenario developer will be able to enter the simulated universe 146 and use a stop watch to time how long it will take to drive between one location within the simulated universe 146 and another location within the simulated universe 146. The function called by the Time Path line 342*e* will be discussed in greater detail with reference to FIG. 13 below.

If the scenario developer selects the Delete All Paths line 342*f*, then the computer 114 will erase the programmed vehicle attributes and vehicle paths from its memory. The specific operation of the computer 114 when it performs the functions called by the scenario developer from the lines 342*c*, 342*d*, and 342*e* of the Program Menu 329 will now be described in greater detail.

Figure 9:
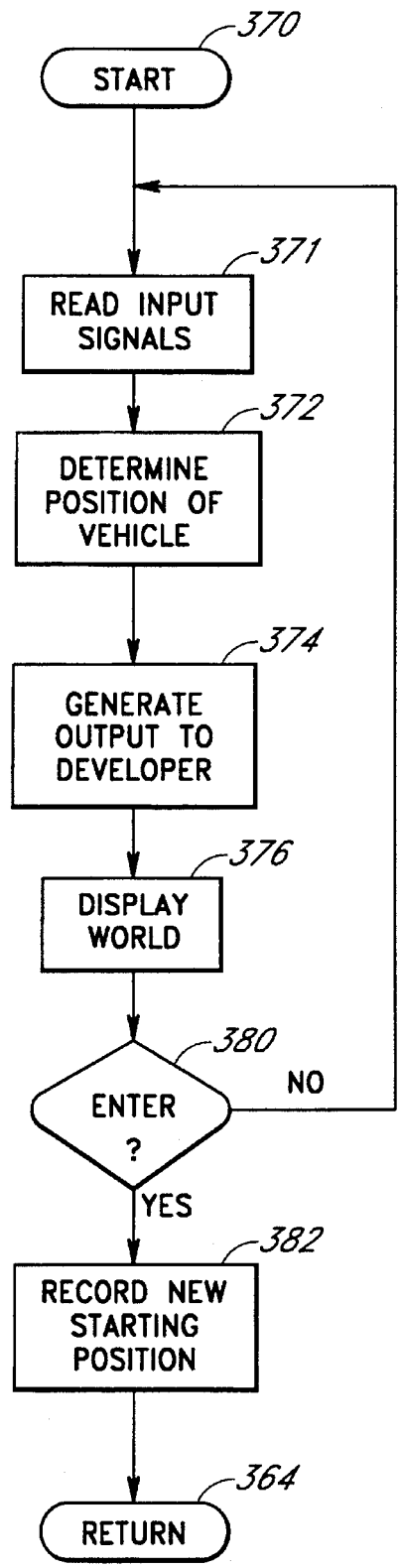
FIG. 9 is a flow diagram of a function for setting the user's starting position in a simulation scenario under development using the vehicle simulation system shown in FIG. 1.

FIG. 9 illustrates the flow diagram of the computer 114 when it is performing the function entitled "do_place_start" called by the scenario developer from the Set Start Up Position line 342*c* of the Program Menu 329 (FIG. 8). In a start state 370, the computer 114 displays the simulated universe 146 on the video display 122 as seen from a default start position and causes the video display 122 to display instructions to the scenario developer to drive the vehicle to the position that the developer wants the observer vehicle to be at the start of the simulation scenario.

Figure 10:
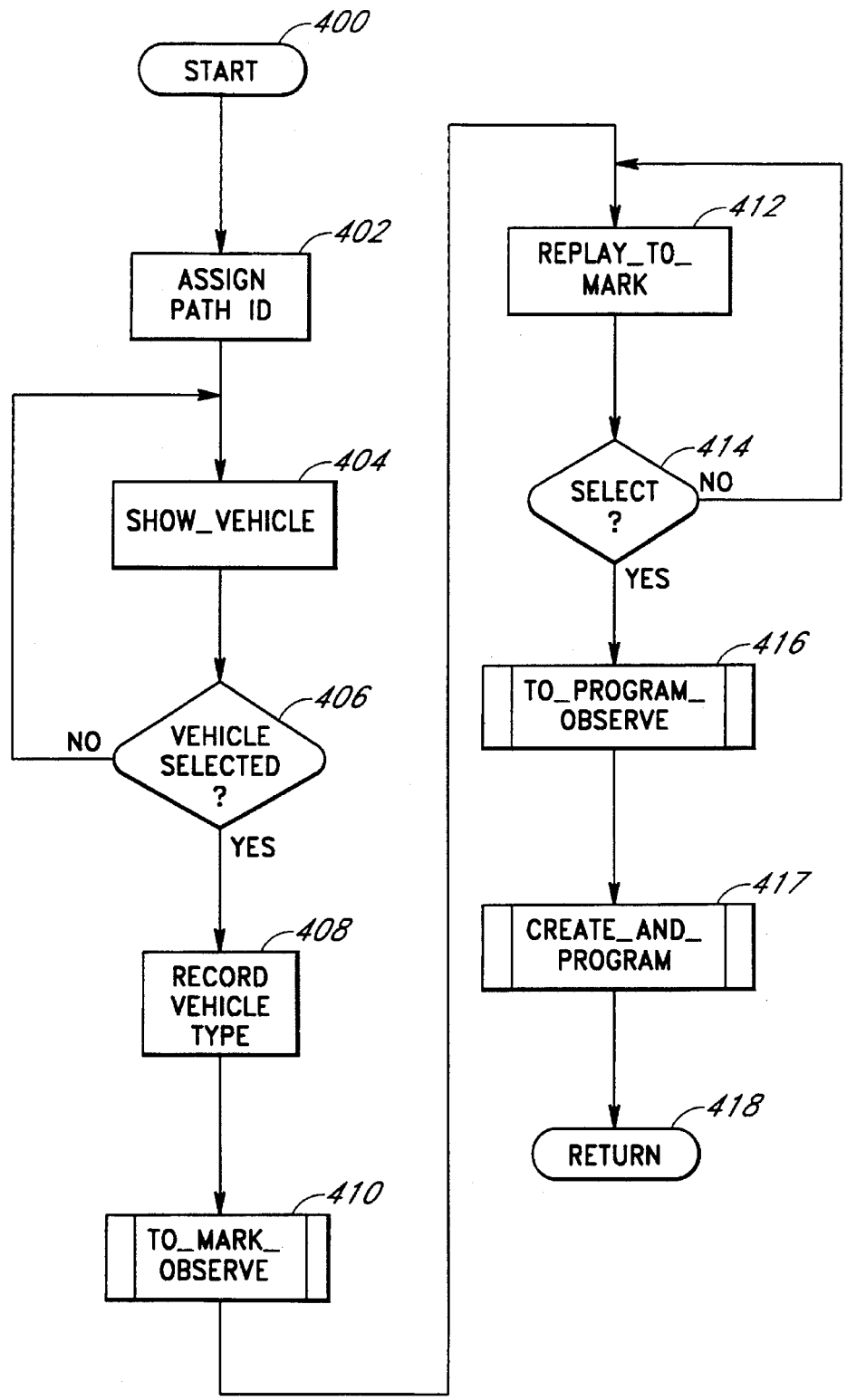
FIG. 10 is a flow diagram of a function entitled "program_vehicle" for adding a vehicle to a simulation scenario under development using the vehicle simulation system shown in FIG. 1.

Referring to FIGS. 1 and 10, the computer 114 moves to a state 371 where it reads the inputs provided by the developer via the input devices 104–112 (FIG. 1). The computer 114 proceeds from state 371 to a state 372 where it will determine the position in the simulated universe 146 of the vehicle currently being driven by the developer. In the state 372, the computer 114 sends signals on the data path 118 to the model process 116 representative of the developer inputs on the input devices 104–112. The model process 116 processes the input signals and determines the Cartesian coordinates of the vehicle in the simulated universe 146 relative to the default starting position based on these inputs. The computer 114 proceeds from the state 372 to a state 374 where it will generate output signals to the developer. These output signals include sounds representative of driving via the speakers 123 and 124 as well as road feel cues via the speaker 136 and vehicle control feedback feelings via the steering wheel 112 and the brake pedal 106. The computer 114 moves from the state 374 to a display world state 380 where it causes the video display 122 to display the simulated universe 146 based on the position of the vehicle being driven by the developer, as given by the model process 116 in the state 372.

After displaying the simulated universe 146, the computer 114 proceeds to a decision state 380 where it checks to see if the scenario developer has manipulated the enter rocker switch 182 thereby indicating that he had selected the new starting position of the observer vehicle. If the computer 114 detects that the developer has not manipulated the enter switch 182, then the computer will return to the state 371 where it will again read the input signals from the input devices. The computer 114 will continue the loop comprising states 371 through 380 until the developer manipulates the enter rocker switch 182. The loop comprising the states 371 through 380 enable the scenario developer to drive the vehicle through the simulated universe 146 in the same fashion that the user 102 would be able to drive the observer vehicle through the simulated universe 146 when the simulation was running.

If the computer 114 detects that the developer has manipulated the enter rocker switch 182, it then moves to a state 382 where it will record in memory the new starting position for the observer vehicle for this particular scenario. After recording the new starting position, the computer 114 then moves to a return state 362 where it will return the developer to the program menu 329 (FIG. 8). If the developer does not desire to create a new starting position for the observer vehicle for this scenario, the computer 114 will then start the observer vehicle at a preselected default position in the simulated universe 146.

FIG. 10 illustrates the flow diagram followed by the computer 114 in one preferred embodiment of the present invention for implementing the function entitled "program_vehicle" called when the developer selects the Add Vehicle line 342*d* of the Program Menu 329 (FIG. 8). The computer 114, in response to the developer selecting the Add Vehicle line 342*d* moves to a start state 400. From the start state 400, the computer 114 moves to a state 402 where it assigns the programmed vehicle to be added, and its path through the simulated universe 146, an identification number 000 to 255. This number is either the next highest available number within the range 000 to 255 or it is the number the developer selected via the Next Path ID line 324*a* (FIG. 8) described above. After assigning the vehicle an identification number, the computer 114 moves to a state 404 where it implements a function entitled "show_vehicle". In this function, the computer 114 causes a series of vehicles types to be displayed to the developer on the video screen 122, from which the developer will select the vehicle type that he wishes this programmed vehicle to be. The computer 114 moves from the "show_vehicle" function 404 to a decision state 406 where the computer 114 determines whether the developer has selected a vehicle type for the programmed vehicle to be added. If the developer has not selected a vehicle type, the computer 114 will return to the "show_vehicle" function 404.

If the developer has selected a vehicle type, the computer 114 then moves from the decision state 406 to a state 408 where the computer 114 will record in memory the vehicle type selected for this programmed vehicle. The computer 114 then performs a function 410 entitled "to_mark_observe" where the computer 114 generates on the video display 122 (FIG. 1) the simulated universe 146 and instruct the developer to drive to the position within the simulated universe 146 where he can observe the previously programmed vehicles within the scenario when the scenario is replayed. The computer 114 proceeds from the "to_mark_observe" function 410 to a function 412 entitled "replay_to_mark". In the "replay_to_mark" function 412, the computer 114 will replay the scenario from the Scenario Start Time as designated by the developer on the Scenario Start Time line 342*b* of the Program Menu 329 (FIG. 8). The computer 114 replays the scenario in essentially the same manner it plays the scenario to a user 102. Specifically, the computer 114 will generate the previously programmed vehicles within the simulated universe 146 in the same manner as described in relation in the "update_scenario" function 244 (FIG. 6).

From the "replay_to_mark" function 412, the computer 114 proceeds to a decision state 414 where the computer 114 determines whether the developer has pressed the select rocker switch 184 (FIG. 3). If the developer has not pressed the select rocker switch 184, the computer 114 returns to the "replay_to_mark" function where it continues to replay the scenario as it was previously recorded.

If the developer has pressed the select rocker switch 184, the computer 114 proceeds to a function 416 entitled "to_program_observe". In the function 416, the computer 114 will freeze the replay of the scenario, as well as the scenario timer, and instruct the developer to drive to the position within the simulated universe 146 he desires the programmed vehicle being added to appear in the scenario.

After the developer has driven to this position, the developer will press the enter rocker switch 182 thereby signalling the computer 114 to perform a function entitled "create_and_program" 417. In the function 417, the computer 114 instructs the developer to drive the programmed vehicle to be added along the path in the simulated universe 146 in the manner that he wishes the programmed vehicle to appear. When the developer proceeds to drive the programmed vehicle to be added as instructed, the computer 114 initially record the start time, on the scenario clock, and the start location for this vehicle and it then proceeds to record the location in the simulated universe 146 of the programmed vehicle at least 10 times a scenario clock pulse in order to ensure that when the scenario is replayed for the user 102 the programmed vehicle appears to have fluid motion. When the developer signals to the computer 114 that he is finished programming the path of the programmed vehicle, the computer 114 records a final location and a final time, on the scenario clock, for this particular programmed vehicle. From the "create_and_program" function 417, the computer 114 proceeds to a return state 418 where it returns the developer to the program menu 329.

Figure 11:
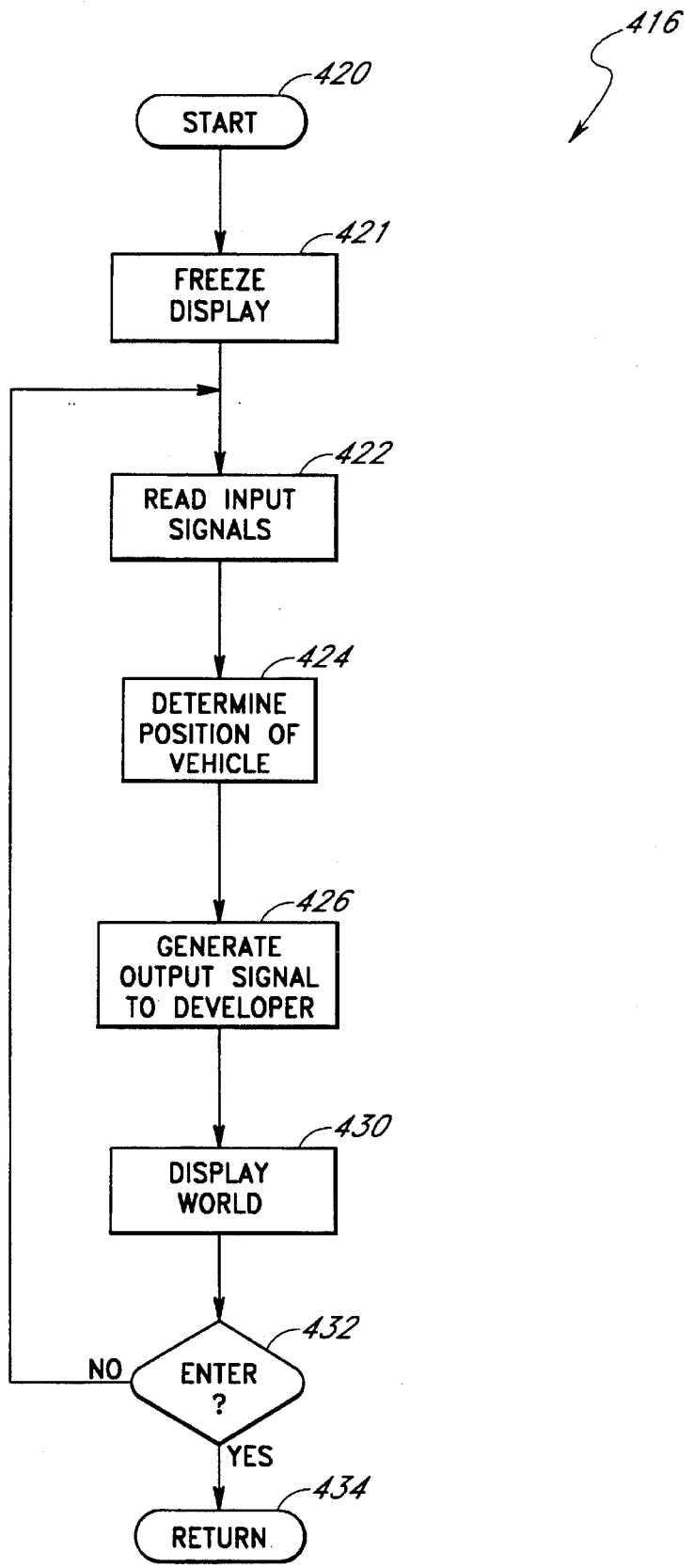
FIG. 11 is a flow diagram for the "to_program_observe" function shown in FIG. 10.

FIG. 11 illustrates the flow diagram of the computer 114 when it is performing the function 416 entitled "to_program_observe". In a start position 420, the computer 114 is displaying the scenario being replayed on the video display 122 as seen from the position the computer 114 determined the developer drove to in the "to_mark_observe" function 410.

The computer proceeds to a state 421 where the scenario being replayed is frozen. In this state, the computer 114 does not update the scenario clock hence position of the programmed vehicles being replayed is not updated either, making them appear stationary in the simulated universe 146. The computer 114 proceeds from the state 421 to the state 422 where it reads the inputs provided by the developer via the input devices 104–112 (FIG. 1) while the developer drives the programmed vehicle to be added through the simulated universe 146 to the position that he wishes it to appear.

The computer 114 will then move to a state 424 where it will determine the position of the vehicle in the simulated universe 146. In the state 424, the computer 114 sends signals on the data path 118 to the model process 116 representative of the developer inputs on the input devices 104–112 (FIG. 1). The model process 116 then processes the input signals and determines the Cartesian coordinates of the developer in the simulated universe 146 relative to the default starting position based on these inputs. The computer 114 then moves to a state 426 where it will generate output signals to the developer. These output signals include sounds representative of driving via the speakers 123 and 124 as well as road feel cues via the speaker 136 and vehicle control feedback feelings via the steering wheel 112 and the brake pedal 106 (FIG. 1). The computer 114 then moves to a display world state 430 where it causes the video display 122 to display the simulated universe 146 in the video display 122 based on the position of the developer, as given by the model process 116 in the state 424.

Continuing to refer to FIG. 11, the computer 114 then moves to a decision state 432 where it checks to see if the developer has manipulated the enter rocker switch 182 (FIG. 3) thereby indicating that he wants the computer 114 to record the path of the programmed vehicle to be added. If the computer 114 detects that the developer has not manipulated the enter switch 182 in the decision state 432, then the computer will return to the state 422 where it will again read the inputs provided by the developer. The computer 114 will continue the loop comprising states 422 through 432 until the developer manipulates the enter rocker switch 182, permitting the developer to drive to the position that he wants this programmed vehicle to initially appear in the simulated universe 146. If the computer 114 detects that the developer has manipulated the enter rocker switch 182, it then moves to a return state 434 where it will then initiate the next function 412 entitled "create_and_program".

Figure 12:
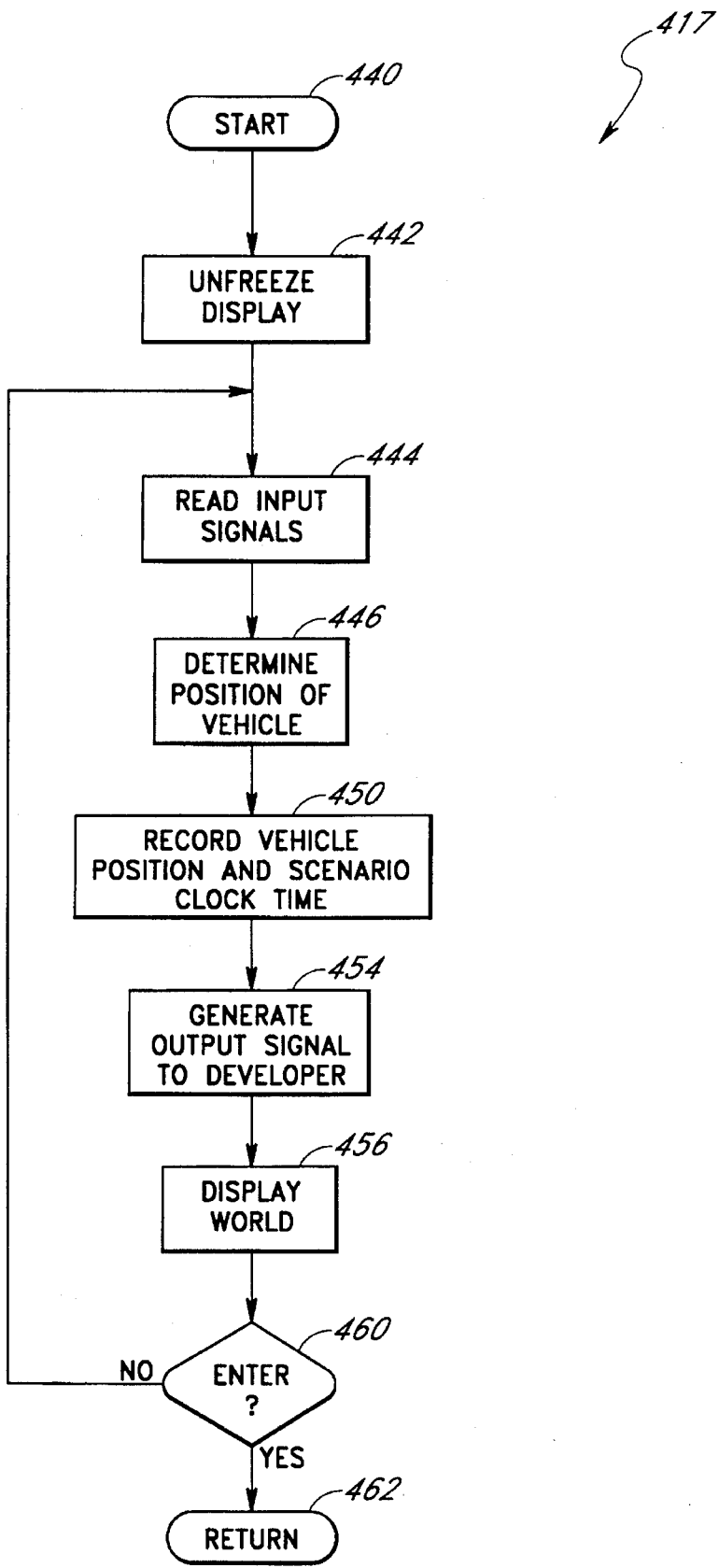
FIG. 12 is a flow diagram for the "create_and_program" function shown in FIG. 10.

FIG. 12 illustrates a basic flow diagram of the computer 114 as it executes the function 417 entitled "create_and_program". The computer 114 enters a start state 440 after the developer has manipulated the enter rocker switch 182 (FIG. 3) in state 432 (FIG. 1). While in the start state 440, the computer 114 is still displaying the simulated universe 146 via the video display 122 (FIG. 1) from the position the developer drove the vehicle to in the "to_program_observe" function 410. The computer 114 proceeds from the start state 440 to an un-freeze display state 442 where the computer 114 begins to update the scenario clock again thereby permitting thereby permitting the programmed vehicles frozen while the computer 114 was in the state 421 of the "to_program_observe" function 416 (FIG. 11) to be updated. From the perspective of the developer, this results in the programmed vehicles beginning to move along their programmed paths through the simulated universe 146.

The computer 114 proceeds from state 442 to a state 444 where it will read the inputs provided by the developer via the input devices 104–112 (FIG. 1). The developer will then proceed to drive the programmed vehicle on a path through the simulated universe 146. The computer 114 moves from state 442 to the state 446 where it will determine the position of the programmed vehicle while it is being driven by the developer in the simulated universe 146 via the model process 116 in a similar fashion as previously described. After this position is determined, the computer 114 then moves to a state 450 where it simultaneously records the position of the programmed vehicle, as given by the model process 116 in state 446 and the time on the scenario clock at which the vehicle is at this position. The manner in which this data is recorded and stored will be described in greater detail in conjunction with FIG. 18.

The computer 114 then moves to a state 454 where it will generate output signals to the developer. These output signals include sounds representative of driving via the speakers 123 and 124 as well as road feel cues via the speaker 136 and vehicle control feedback feelings via the steering wheel 112 and the brake pedal 106 (FIG. 1). The computer 114 then moves to a display world state 456 where it causes the video display 122 to display the simulated universe 146 in the video display 122 based on the position of the programmed vehicle, as given by the model process 116 in the state 446 and as well as based on the time on the scenario timer as being given by the path timer initiated in state 442. The computer 114 when it executes the display world routine in the state 456 will display not only the surrounding houses and streets (See FIG. 2), but also the other programmed vehicles in the scenario that are scheduled to appear in the simulated universe 146 at this time on the scenario timer. This permits the developer to drive this particular programmed vehicle, which is now being added to the simulation, in conjunction with the other programmed vehicles. For example, in the pursuit scenario simulation described previously, the developer may wish to add a vehicle running a stop sign and nearly colliding with another programmed vehicle thereby providing the user 102 in the observer vehicle configured as a police cruiser a reason to pursue this particular programmed vehicle.

The computer 114 then moves to a decision state 460 where it checks to see if the developer has manipulated the enter rocker switch 182 (FIG. 3) thereby indicating that he wants the recording of the position at the present scenario time of the programmed vehicle to be added to end. If the computer 114 detects that the developer has not manipulated the enter switch 182, then the computer returns to the state 444 where it will again read the inputs provided by the developer. As can be appreciated, the computer 114 will continue the loop comprising states 444 through 460 until the developer manipulates the enter rocker switch 182 and this loop permits the developer to drive this particular programmed vehicle through the simulated universe in an analogous manner as a user 102 (FIG. 1) would be able to drive an observer vehicle through the simulated universe when the scenario is being played.

If the computer 114 detects that the developer has manipulated the enter rocker switch 182, it then moves to a return state 462 where it generates the program menu 429 (FIG. 8) on the video display screen 122 and awaits the developer's next input.

Figure 13:
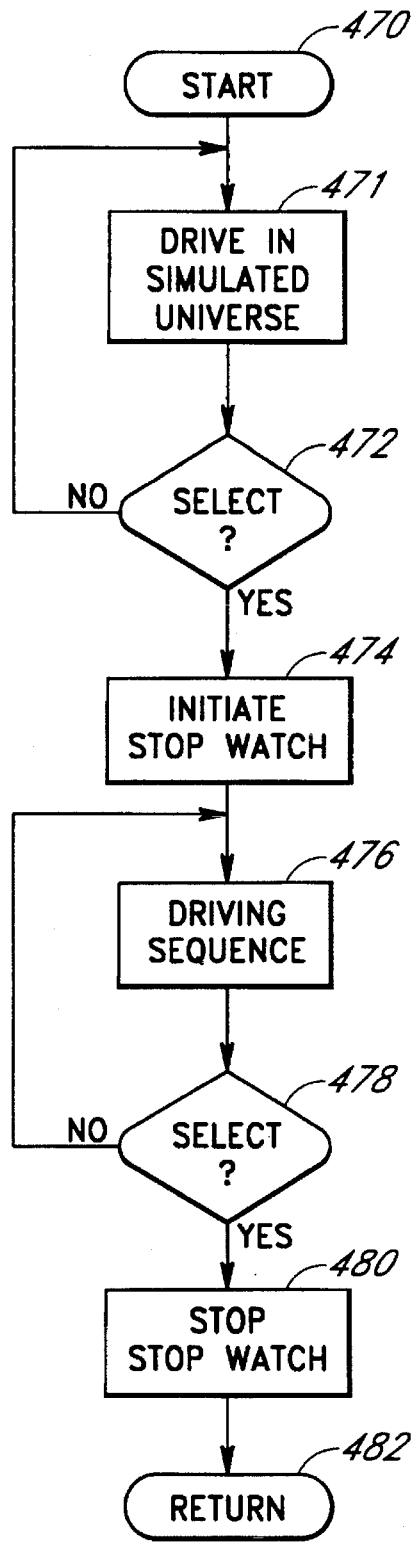
FIG. 13 is a flow diagram of a function entitled "run_timer" for timing the distance between two locations within the simulated universe using the vehicle simulation system shown in FIG. 1.

FIG. 13 illustrates the flow diagram the computer 114 will follow when implementing the "run_timer" function called by the developer selecting the Time Path line 342e of the Program Menu 329 (FIG. 8). The "run_timer" function permits the developer to be able to time how long it will take to drive between locations within the simulated universe 146. Once the developer knows how long it will take to drive between two specific locations, he can then use this information in scheduling when additional programmed vehicles will appear in the simulated universe 146.

Referring now to FIG. 13, from a start state 470, the computer 114 enters a state 471 where the computer 114 displays the simulated universe 146 to the developer via the video display 122 (FIG. 1) and permits the developer to drive around in the simulated universe 146 in a similar manner as described previously it displays the simulated universe 146 to the developer. The developer is then able to drive around in the simulated universe 146 in the same manner as a user 102 (FIG. 1) can when the scenario is played. The computer 114 then enters a decision state 472 where it determines whether the developer has pressed the select rocker switch 184 (FIG. 3). If the computer 114 determines that the developer has not pressed the select rocker switch 184 in the decision state 472, the computer 114 returns to the state 471 where the developer is permitted to drive around the simulated universe 146. If the computer determines that the developer has pressed the select rocker switch 184 the computer 114 then proceeds to a state 474 where it initiates an internal stop watch timer. The internal stop watch timer records the amount of time, according to the scenario timer, between when the select switch 184 is pressed in the state 474 and when it is pressed again in a state 478. After initiating an internal stop watch timer, the computer 114 proceeds to a driving sequence 476 where the computer 114 enables the developer to drive from one location to second location within the simulated universe 146 while incrementing and displaying the stop watch on the video display 122. The driving sequence 476 includes states similar to the states 371 to 376 in "do_place_start" function shown in FIG. 9. From the driving sequence 476, the computer 114 enters the decision state 478 where it determines whether the developer has pressed the select rocker switch 184. If the computer 114 determines that the developer has not pressed the select rocker switch 184, then the computer returns to the driving sequence state 476. If the computer 114 determines that the developer has pressed the select rocker switch 184, then the computer 114 proceeds to a state 480 where the stop watch is stopped and the resulting time is then displayed to the developer. From the state 480, the computer 118 enters a return state 482 which returns the developer to the program menu.

Figure 14:
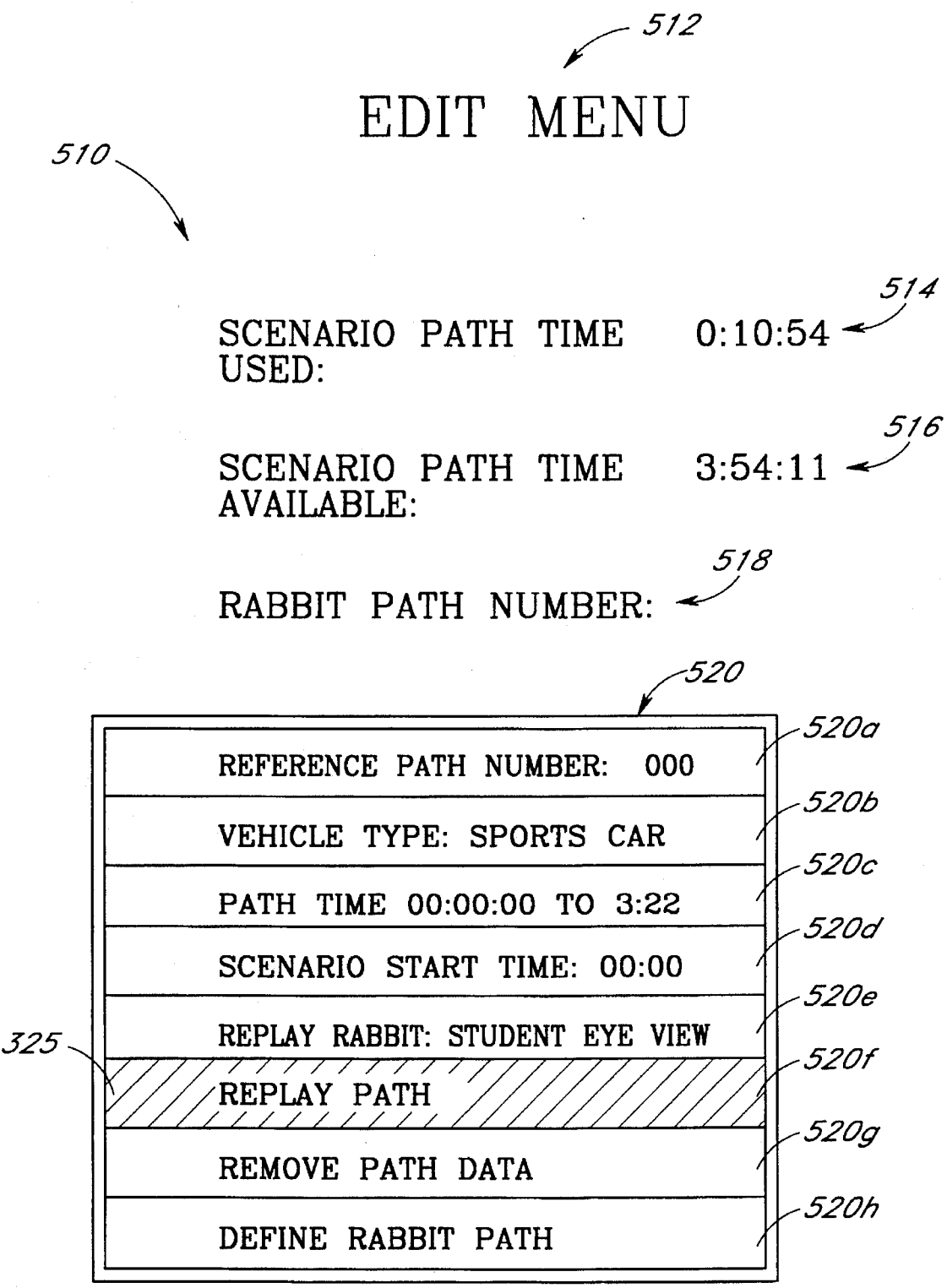
FIG. 14 is a diagram of an edit menu screen provided by the vehicle simulation system shown in FIG. 1.

In this fashion, the developer can use the stop watch to determine how long it will take to drive from one location to another within the simulated universe 146. This information can then be used by the developer to time programmed vehicles to appear at specific locations at specific times on the scenario clock. For example, if the developer wants to have a second programmed vehicle collide with a first programmed vehicle at an intersection, when he knows the time on the scenario clock when the first programmed vehicle will be at the intersection, the developer can use the stop watch to time how long it will take to reach the intersection driving the second programmed vehicle from its starting position within the simulated universe 146. Then, when the second programmed vehicle is added to the scenario, the developer can use this information to determine when, on the scenario clock, he must start driving the second programmed vehicle towards the intersection to collide with the first programmed vehicle. FIG. 14 illustrates an Edit Menu 510 displayed by the computer 114 to the scenario developer via the video display 122 (FIG. 1) in response to the developer selecting the Edit Menu line 324c of the Top Menu 320 (FIG. 7). The Edit Menu 510 has a header 512 which identifies this menu as the Edit Menu 510. The Edit Menu 510 also includes a header 514 indicating how much of the scenario path time has been used, a header 516 which indicates how much of the scenario path time is still available, and a header 518 which indicates the vehicle path ID number of the programmed vehicle selected to be the pursued or rabbit vehicle for a pursuit simulation. From this menu, the developer will be able to make modifications to the attributes of a programmed vehicle as well as modifications of the time in which a programmed vehicle is active in the simulated universe 146.

The Edit Menu 510 contains a box 520 which has a Reference Path Number line 520a, A Vehicle Type line 520b, a Path Time line 520c, A Scenario Start Time line 520d, a Replay Rabbit line 520e, a Replay Path line 520f, a Remove Path Data line 520g, and a Define Rabbit Path line 520h.

The Reference Path Number line 520a displays the identification number of the programmed vehicle and its associated path that he developer is currently editing. The three digit number between 000 and 255 can be changed by the developer in same the manner as previously described for changing Path ID number in the Next Path ID line 324a of the Program Menu 329 (FIG. 8).

The Vehicle Type line 520b displays an identifier of the vehicle type e.g. SPORTS CAR, of the programmed vehicle with the identification number showing on the line 520a. The developer can change the vehicle type for this programmed vehicle by using the select rocker switch 184 (FIG. 3) to move to the line 520b, then by using the enter rocker switch 182 (FIG. 3) to call a function which will permit the identifier to be changed. The developer can then change the identifier shown in line 520b to a different identifier by pressing the select rocker switch 184. When the identifier is what the developer now wants the vehicle type of the programmed vehicle to be, the developer presses the enter rocker switch 182 which causes the computer 114 to record a new vehicle type for the programmed vehicle with the identification number shown on line 520a.

The Path Time line 520c of the Edit Menu 510 shown in FIG. 14 displays the time on the scenario clock that the programmed vehicle with the vehicle number shown on the Reference Path Number line 520a will be active within the simulated universe 146. As can be seen by reference to FIG. 16, the Path Time is displayed in terms of a range from 00:00:00 to 3:22:00, for example. The developer, in this preferred embodiment, can change the starting time point and the ending time point of the range through the "edit_time" function called from the line 520c. For example, the developer can change the time the programmed vehicle is scheduled to appear in the simulated universe 146 to an earlier time, which result in the computer 114 automatically changing the time at which the vehicle is scheduled to leave the simulated universe 146 to a correspondingly earlier time. Hence, the developer simply has to change the start time to change when on the scenario clock the programmed vehicle will be active in the simulated universe 146. Note, the length of time that the programmed vehicle is active within the simulated universe 146 stays the same regardless of any editing the developer does via line 520c.

The developer changes the time at which the programmed vehicle is scheduled to appear in the simulated universe 146 by pressing the select rocker switch 184 and the enter rocker switch 182 (FIG. 3) in the following manner. The developer pressing the enter rocker switch 182 to access the first digit. The developer then presses the select rocker switch 184 to change the digit to the desired number. The developer then presses the enter rocker switch 182 to record this digit change. This process is repeated for all of the digits shown for the starting path time on the line 520c.

The Scenario Start Time line 520d of the Edit Menu 510 (FIG. 14) shows the time at which the scenario will be displayed from if it is replayed. The developer can change this scenario start time by changing the digits to the desired scenario time by manipulating the enter rocker switch 182 and the select rocker switch 184 in a similar manner as described above. This permits the developer, when he replays the scenario he is programming, to view only a selected portion of the scenario as opposed to the entire scenario from the beginning.

The Replay Rabbit Line 520e enables the developer to replay the programmed scenario on the video screen 122 from the viewpoint of looking at the programmed vehicle which has been designated the rabbit or pursued vehicle for a pursuit simulation. The developer has the choice of viewing the replay from an overhead position, looking down on the rabbit vehicle 150 from 200 feet above or from the viewpoint of the student or user 102 (FIG. 1) in the observer vehicle, on the ground as the rabbit vehicle 150 passes.

The Replay Path line 520f enables the developer to view the path followed by the programmed vehicle having the reference number currently showing in the Reference Path Number line 520a. The developer has the option of viewing this path from either the viewpoint of a student or user 102 (FIG. 1) on the ground or an overhead view as in the Replay Rabbit option of line 520f. The operation of the computer 114 and its associated flow diagram are similar for both of the functions called the line 520e and the line 520f and will be described in relation to FIG. 15 below.

The Removed Path Data line 520g permits the developer to remove the programming vehicle having the identification number shown on line 520a. The Define Rabbit Path line 520 enables the developer to define which of the programmed vehicles, 000 to 255, will be considered the rabbit vehicle 150. This permits the developer to specify different vehicles and paths for the user 102 to follow when the user 102 is engaged in the scenario.

Figure 15:
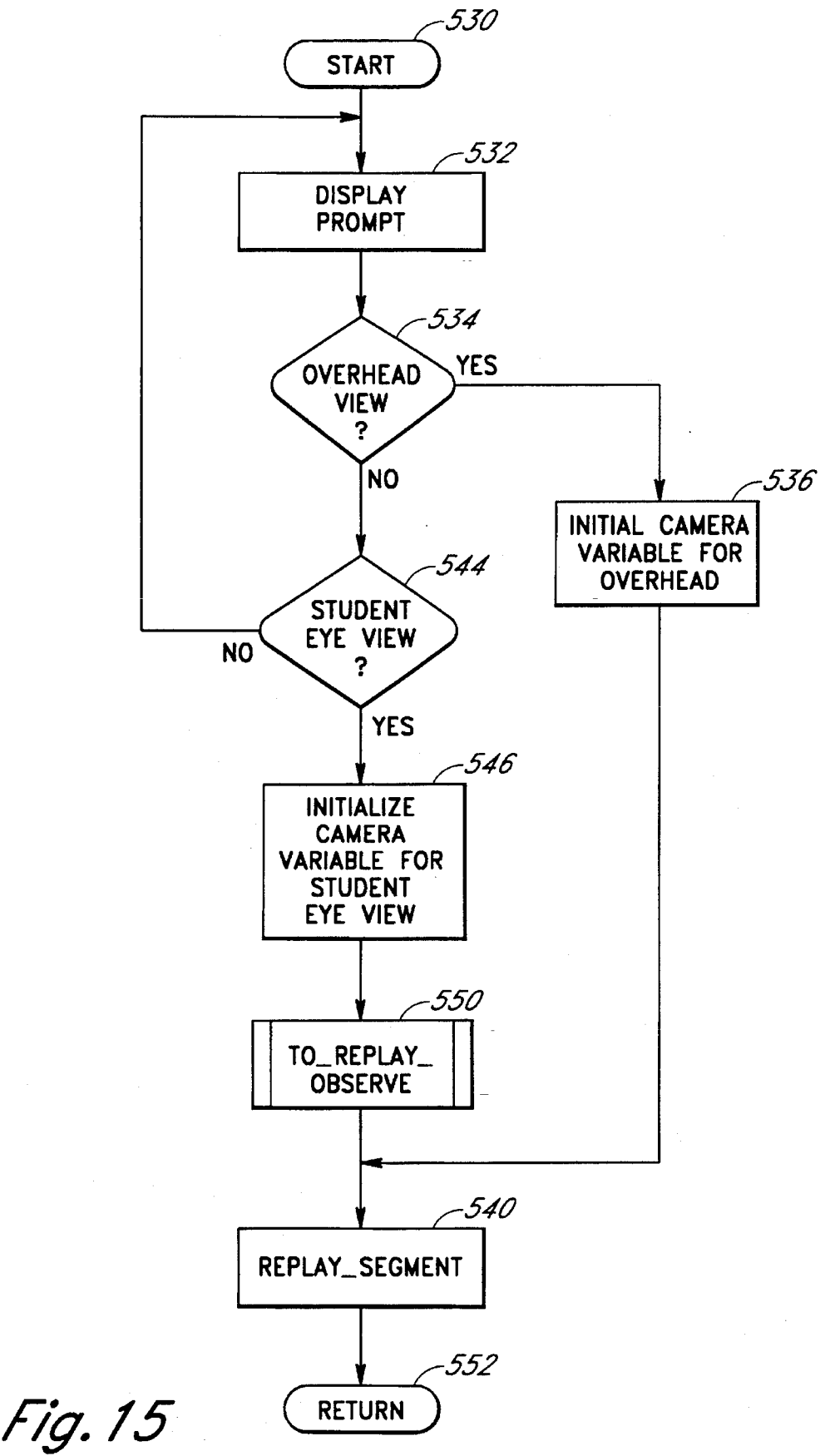
FIG. 15 is a flow diagram of a function for replaying the path of the pursued vehicle using the pursuit vehicle simulation system shown in FIG. 1.

FIG. 15 illustrates the flow diagram that the computer 114 follows when it implements the function called by the Replay Rabbit line 520e of the Edit Menu 510. Beginning from a start state 530, the computer 114 moves to a state 532 where it displays a prompt on the video display 122 asking the developer whether he wants the overhead view or the student's eye view. The computer 114 proceeds from state 532 to a decision state 534 where it checks to see if the developer wants an overhead view. If the developer signifies that he wants an overhead view by manipulating the rocker switches 182 and 184 (FIG. 3) in an appropriate manner, the computer 114 proceeds to a state 536 where it initializes a camera angle variable (editview) such that it indicates the developer wants to have the overhead view when viewing the replay of the rabbit vehicle 150. The computer 114 then performs a "replay_segment" function 540 where the computer 114 recalls the path of the rabbit vehicle 150 from memory, as well as the paths of the other programmed vehicles in the scenario and replays the paths of all of these vehicles on the video display 122 from the overhead point of view.

The computer 114 proceeds from the "replay_segment" function to a return state 552 where it will return the developer to the Edit Menu 510. If at decision state 534, the computer 114 determines that the developer does not want an overhead view, it then moves to a decision state 544 where it checks to see if the developer wants a student's eye view. If the developer manipulates the rocker switches 182 and 184 (FIG. 3) in a manner signifying that he wants a student's eye view, the computer 114 then moves to a state 546. In the state 546, the computer 114 initializes the camera variable (editview) indicating that a student's eye view has been selected. The computer 114 then performs a function 550 entitled "to_replay_observe". The "to_replay_observe" function 550 is identical to the "to_program_observe" function 410 (FIG. 10 and FIG. 11) as previously described in that it instructs and permits the developer to drive to a position where he wants to observe the rabbit vehicle 150.

The computer 114 then moves to the state 540 where the "replay_segment" routine is performed. In this state the computer 114 will display on the video screen 122 the rabbit vehicle 150 in the simulated universe 146 (FIG. 2) from the point of view of the student or user 102 (FIG. 1) while driving the simulation. The computer 114 permits the developer to follow the rabbit vehicle 150 through the simulated universe 146 by manipulating the input devices 106, 108, 110, and 112 (FIG. 1) in the previously described manner. The computer 114 will then move to a return state 552 where it will return the developer to the Edit Menu 510. If the computer 114, at the decision state 544, determines that the developer has not selected the student's eye view, it return to the display prompt state 532. Note, if the developer has specified a scenario start time on Line 520d, then the computer 114 in state 540 will only replay the segment from the specified scenario clock time onward.

FIG. 16 illustrates a Play Menu 600 that the developer would see on the display video display 122 had he selected the Play Menu line 324a of the Top Menu 320 (FIG. 7). From this menu, the developer will be able to view segments of the programmed scenario as it would be seen by the player. Further, from this menu, the developer will also be able to see how these segments would look if some of the conditions in the simulated universe 146 were altered. The Play Menu 600 contains a header 602 indicating that this is the Play Menu. The Play Menu 600 also contains a Scenario Path Time Used header 604 which indicates to the developer the amount of path time that has been used for this scenario, a Scenario Path Time Available header 606 which indicates to the developer the amount of path time which is still available, as well as a Scenario End Time header 608 which indicates to the developer the length of this programmed scenario. Also included in the Play Menu 600 is a Number of Paths header 610 which tells the developer the number of vehicles paths which have been programmed into this scenario.

Also included in the Play Menu is a programming box 612 containing a Play Scenario line 612a, a Scenario Start-Time line 612b, a View line 612c, a Rabbit Speed line 612d, a Student Vehicle line 612e, and a Weather line 612f. The Play Scenario line 612a enables the developer to play the scenario, or segments of it, and view it, either from an overhead angle or as it would appear to the user 107 (FIG. 1) in a variety of programmable conditions. This gives the developer some feedback as to how his scenario will look to the user 107 in certain conditions thereby enabling him to make adjustments to the scenario as he decides they are needed. When the developer chooses to play the scenario, the computer 114 then generates a display of the scenario via the video display 122 (FIG. 1) based upon the inputs provided by the lines 612b through 612f.

The Scenario Start Time line 612b permits the developer to select the point in time at which he wishes to begin viewing the scenario. The computer 114 typically shows the scenario from the beginning when the Play Scenario line 612a is selected, however the developer may wish to see only a small segment of the scenario and not necessarily all of it. The Scenario Start Time is changed digit by digit by the developer manipulating the enter rocker switch 182 (FIG. 3) and the select rocker switch 184 (FIG. 3) in the same manner as previously described.

The View Line 612c enables the developer to select the view that he will have of the scenario when the Play Scenario Line 612a is selected. Several views are possible including the overhead view and the student's eye view that was available from the Edit Menu 510 (FIG. 14) for when a vehicle path was replayed and when the path of the rabbit vehicle 150 (FIG. 2) was replayed. The manner in which the computer 114 generates these scenarios on the video screen 122 is similar to the manner in which the computer 114 generated the replays of the rabbit path and specific vehicle paths from the Edit Menu 510 (FIG. 14).

The Rabbit Speed line 612d enables the developer to view the scenario as it would be if the speed of the rabbit vehicle 150 in a pursuit simulation was fixed, or view the scenario as it would be if the speed of the rabbit vehicle 150 was adjusting in the fashion described in relation to FIGS. 5 and 6.

The Student Vehicle line 612e enables the developer to view the scenario with the observer vehicle being one of several types of vehicles. These vehicle types are the same vehicle types as described before including the police cruiser, the sports car, the sedan, and the gravel truck.

The Weather Line 612f further enables the developer to see how the scenario would look is the weather conditions were changed. Assignee's co-pending U.S. patent application entitled "Driver Training System with Performance Data Feedback" Ser. No. 07/888,375 filed May 22, 1992, discloses a simulation system which includes a means for providing different weather conditions in the simulated universe, e.g. snow, rain, clear weather, fog, night time etc. One preferred embodiment of the pursuit simulation system herein described will include the means for providing different weather conditions in the simulated universe disclosed in Assignee's co-pending application. Consequently, the Play Menu 600 includes line 612*f* which will show the developer how the scenario he has programmed will look in these different weather and viewing conditions.

IV. EXAMPLE SCENARIO DEVELOPMENT

Figure 17:
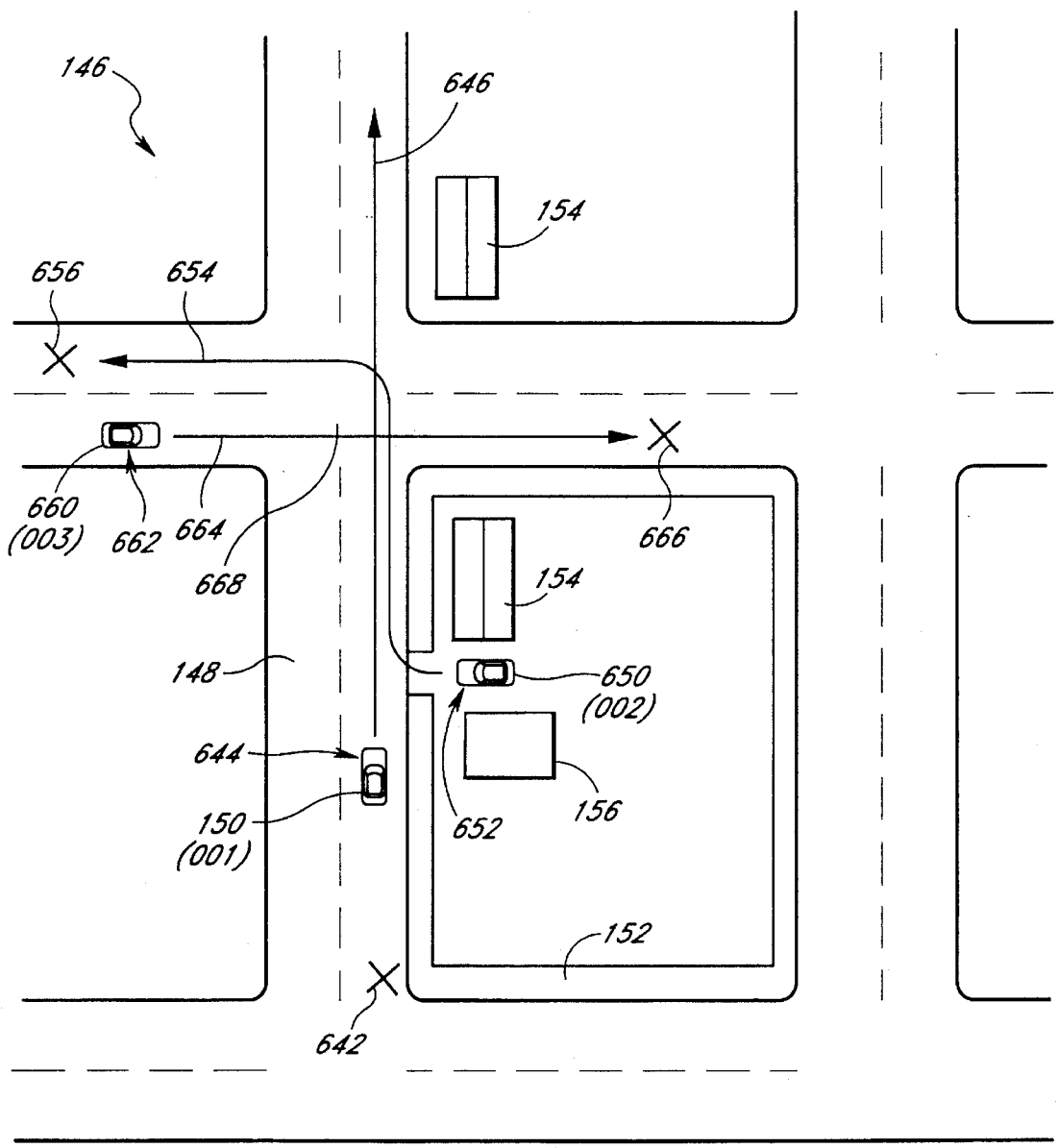
FIG. 17 is an overhead view of a portion of the simulated universe containing vehicles and vehicle paths programmed by the developer using the simulation development system of FIG. 1.

FIG. 17 illustrates a portion of the simulated universe 146 as it would appear when viewed from overhead. As can be seen, this portion of the simulated universe 146 includes a network of roads 148, several houses 154, one out-building 156, the programmed pursued vehicle 150, and two programmed vehicles 650 and 660.

The developer would develop this particular scenario in the following manner. The developer starts at the Top Menu 320 (FIG. 7) and goes to the Program Menu 329 by selecting line 324*b*. Once in the Program Menu 329 (FIG. 8), the developer selects the location within the simulated universe 146 where the observer vehicle 640 will begin the scenario when it is played. The developer accomplishes this by selecting the Set Start Up Position line 342*c* of the Program Menu 329 which will cause the computer 114 to execute the "do_place_start" function (FIG. 9) which places the developer at a selected point within the simulated universe 146. The developer then drives to a point 642 within the simulated universe 146 where he wants the observer vehicle 640 to be when the simulation begins. Once the developer has driven to this position, the developer presses the enter rocker switch 182 (FIG. 3), thereby storing this location in memory. The computer 114 then returns the developer back to the Program Menu 329.

The developer may then program vehicles to appear within the scenario he is developing. To add a first programmed vehicle 150, the developer selects the Add Vehicle line 342*d* of the Program Menu 329 (FIG. 8). Selecting this line causes the computer 114 to perform the "show_vehicle" function 404 (FIG. 10) where it generates on the video display 122 (FIG. 1) pictures of various types of vehicles from which the developer selects a vehicle type for the first programmed vehicle 150. The computer 114 then assigns the first programmed vehicle 150 an identification number 000–255, which is either the number programmed by the developer on the Next Path ID line 342*a* of the Program Menu 329 (FIG. 8) or it is the next number available to the computer 114. In the scenarios shown in FIG. 19, the identification number assigned to the first programmed vehicle 150 is 001. The computer 114 then places the developer inside the simulated universe 146 and directs him to drive to a position 644 where he wishes the first programmed vehicle 150 to appear. When at the position 644, the developer presses the enter rocker switch 182 (FIG. 3), whereupon the computer 114 executes the "create_and_program" function 417 (FIG. 10) where it begins recording the path of the first programmed vehicle 150. As shown in FIG. 19, in this scenario, the developer drives the first programmed vehicle 150 in the direction of the arrow 646. After the developer has finished driving the path of the vehicle 150 in the simulated universe 146, the developer will again press the enter rocker switch 182 to signal to the computer 114 to stop recording the path of the vehicle 150. The developer can then go to the Edit Menu 510 (FIG. 14) where the developer designates the programmed vehicle with the identification number of 001 to be the rabbit or pursued vehicle 150 via the Define Rabbit Path Line 520*h* of the Edit Menu 510 (FIG. 14).

The developer may then wish to program a second programmed vehicle 650 to appear in the scenario shown in FIG. 19. To accomplish this, the developer returns to the Program Menu 329 (FIG. 8) and begins programming the second programmed vehicle 650 by again selecting the Add Vehicle line 342*d* of the Program Menu 329 (FIG. 8). The developer is again asked to select a vehicle type for this vehicle, and the computer 114 assigns the second programmed vehicle 650 an identification number, which, in this case, is 002. The computer 114 then performs the "to_mark_observe" function 410 (FIG. 10) where it displays the simulated universe 146 to the developer via the video display 122 (FIG. 1) and instructs and permits the developer to drive to a location where he can observe the scenario unfold. After the developer has driven the second programmed vehicle 650 to this location, he then presses the select rocker switch 184 (FIG. 3) whereupon the computer 114 executes the "replay_to_mark" function 412 where it replays the portion of the scenario from either the beginning of the scenario or the time selected by the developer via the Scenario Start Time line 342*b* of the Program Menu 329 (FIG. 8). In this case, the computer 114 would replay the first programmed vehicle, designated to be the rabbit vehicle 150, driving in the direction of the arrow 646 down the street 148. The developer then presses the select rocker switch 184 to stop the scenario clock and thereby freeze the replay of the scenario, where the first programmed vehicle 150 will appear to be stationary in the simulated universe 146 to the developer. The computer 114 then executes the "to_program_observe" function 416 (FIG. 10 and 11) where the developer is instructed to drive to a position 652 where the second programmed vehicle 650 will be introduced into the simulated universe 146.

After the developer has driven the second programmed vehicle 650 to the location 652, he then presses the enter rocker switch 182 (FIG. 3) to initiate the recording of the path of the second programmed vehicle 650 in the memory of the computer 114 via the "create_and_program" function 417 (FIG. 10 and FIG. 12). In the function 417, the computer 114 will restart the frozen scenario and record the path of the second programmed vehicle 650 as it is driven by the developer in the direction of an arrow 654 to a location 656.

Since the developer can see when the rabbit vehicle 150 will pass on the street 148 in front of the location 652, the developer can initiate the recording of the path of the second vehicle 650 at the point where the first programmed or rabbit vehicle 150, drives in front of the location 652 on the street 148. Hence, the developer can time the second programmed vehicle 650 to drive out from behind the outbuilding 156 just after the first programmed vehicle 150 has passed. From the standpoint of a user 102 when the scenario is played, the user 102 in the observer vehicle is pursuing the rabbit vehicle 150 down the street 148 when the second programmed vehicle 650 appears out from behind the outbuilding 156, thereby requiring the user 102 to take evasive action to avoid colliding with the second programmed vehicle 650. The developer can further refine the time at which the second programmed vehicle 650 appears by changing the start and end time on the scenario clock via the Path Time line 520*c* of the Edit menu 510 (FIG. 14).

The developer may wish to add additional vehicles to the scenario via the Add Vehicle Line 342*d* of the Program Menu 329. In the scenario shown in FIG. 17, the developer has added a third programmed vehicle 660, which has been assigned the Path ID number of 003 by the computer 114, which will appear in the simulated universe at location 662 and drives in the direction of an arrow 664 to a location 666. Again, the developer drives the third programmed vehicle 660 in the manner he wishes it to appear in the simulated universe 146. Hence, the developer can program the third programmed vehicle 660 to appear in the simulation universe 146 at the appropriate time on the scenario clock to drive across the intersection 668 after the first programmed vehicle 150 and the second programmed vehicle 650 have driven through the intersection, but prior to when the user 102 (FIG. 1) in the observer vehicle will drive through the intersection. The developer can further drive the third programmed vehicle 660 to drive through this intersection at an extremely high rate of speed to thereby create an event where the user 102 will have to take evasive action to avoid being hit by the third programmed vehicle 660. The developer can also use the stopwatch of the Time Path line 342e of the Program Menu 329 (FIG. 8) to time how long it will take to drive the third programmed vehicle 660 from its initial location 662 to the intersection 668. This permits the developer to determine how long it takes to drive the third programmed vehicle 660 to the intersection 668 and to use this information to ensure that the third programmed vehicle 660 is timed to arrive in the intersection 668 at about the same time on the scenario clock as the observer vehicle.

In this fashion, the developer can continue to add vehicles to the simulated universe 146 and time them to appear to create additional traffic events and hazards for the user 102 (FIG. 1) in the observer vehicle. Further, the developer can use the Replay Rabbit feature of the Replay Rabbit line 520e or the Replay Path feature of the Replay Path line 520f of the Edit Menu 510 (FIG. 14) to replay the paths, or selected portions thereof, of the programmed vehicles. Further, the developer can also use the features of the Play Menu 600 (FIG. 16) to view how the scenario will look in various weather conditions via the Weather line 612f, or with the speed of the rabbit vehicle being either adjusting or fixed via the Rabbit Speed line 612d.

V. SIMULATION SCENARIO DATA STRUCTURE

Figure 18:
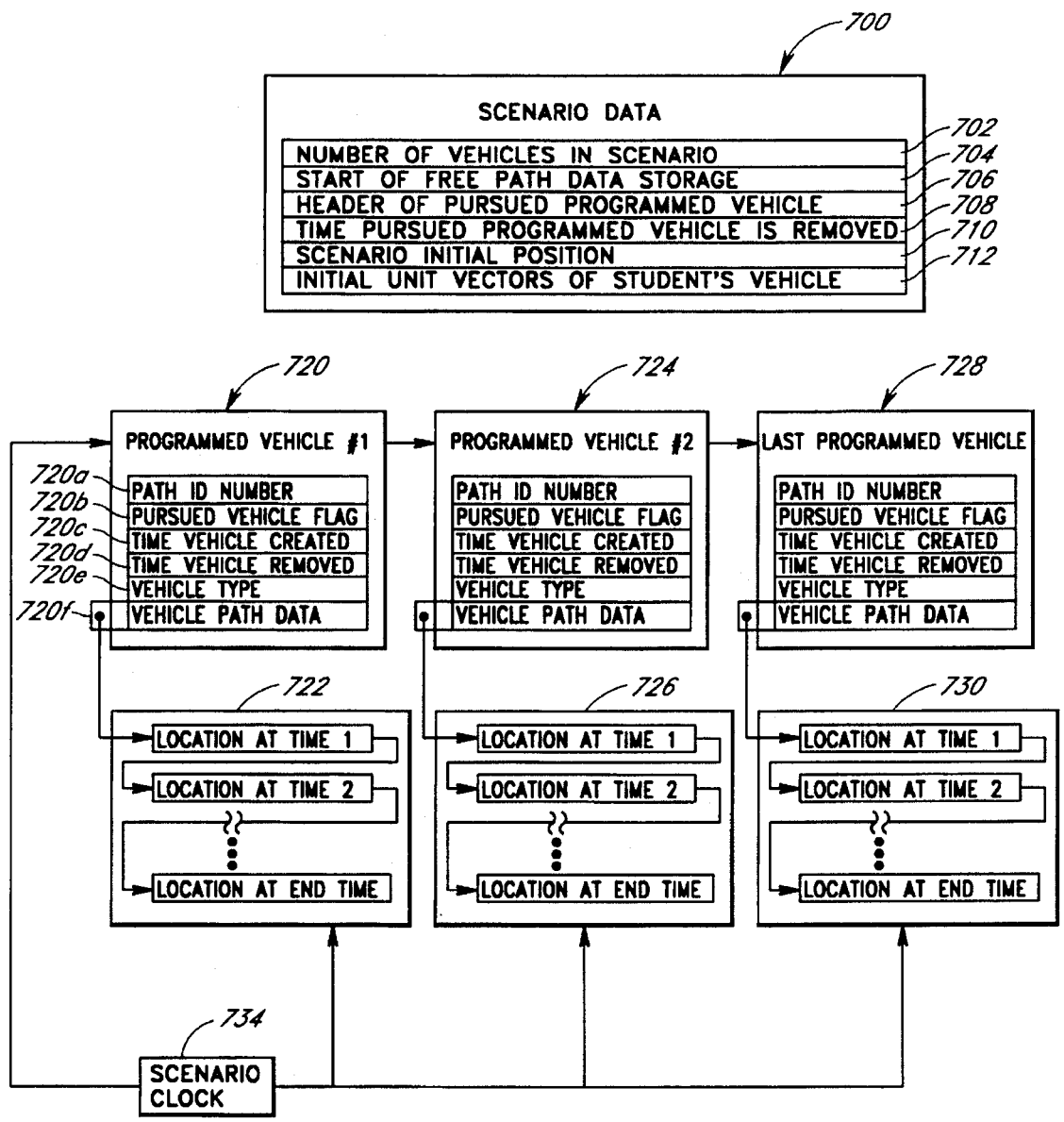
FIG. 18 is an organizational chart detailing the data structures employed to develop and use a pursuit simulation scenario via the vehicle simulation system shown in FIG. 1.

FIG. 18 is an organizational chart of the scenario data relating to a simulation scenario developed in the above-described manner as it is arranged in the memory of the computer 114. A data structure 700 stores data about a single scenario. This data is initially programmed by the developer using the simulator input controls 104–112 and the computer 114 (FIG. 1). Preferably, this information is subsequently uploaded into the memory of the personal computer 103 where it is stored until the scenario is required by a user.

Data about the number of programmed vehicles in the scenario is stored in an area 702. The number of programmed vehicles stored within the memory is determined by a counter keeping count of the number of vehicles added by the developer via the Add Vehicle line 342d of the Program menu 329 (FIG. 8). In the presently preferred embodiment, there is a limit of 256 vehicles that can be programmed into any one scenario.

Also stored within the data structure 700, in an area 704, is an indicator of where the free path data exists. As will be described in greater detail below, all the paths of the programmed vehicles through the simulated universe 146 (FIG. 17) are stored in the memory of the computer 114 in terms of a location in the simulated universe 146 at a given time on the scenario clock. In this preferred embodiment, at any one time on the scenario clock there can only be twenty programmed vehicles active in the simulated universe 146 (FIG. 17) at any one time. The information contained in area 704 provides information about the next scenario time which is available to have an additional programmed vehicle made active within the simulated universe 146.

An area 706 within the data structure 700 contains the programmed vehicle path identification number (000 to 255) of the programmed vehicle for a pursuit simulation which has been designated as the pursued (or rabbit) vehicle 150 (FIG. 17) by the developer. The developer designates one of the programmed vehicles as the rabbit vehicle 150 via the Define Rabbit Path line 520h of the Edit Menu 510 (FIG. 1).

An area 708 contains information about when, according to the scenario clock, the rabbit vehicle 150 (FIG. 17) has been removed from the simulated universe 146. The developer programs the path of rabbit vehicle 150, as well as when it appears and when it leaves the simulated universe 146, in the same fashion as it programs these same variables for any other programmed vehicle in the scenario by using the Add Vehicle line 442d of the Program Menu 329 (FIG. 8). The only difference, however, is that the developer must designate this particular programmed vehicle as the rabbit vehicle 150 (FIG. 17) via the Define Rabbit Path 520h of the Edit Menu 510 (FIG. 16). The information contained in area 708 provides the computer 103 with an indication of when the scenario is programmed to end, as a pursuit simulation scenario will end when the rabbit vehicle 150 leaves the simulated universe 146.

An area 710 contains the Cartesian coordinates of the initial position of the observer vehicle in the simulated universe 146 (FIG. 17). An area 712 additionally contains information about the initial unit vectors of the observer vehicle at its initial position within the simulated universe 146. The initial position and the initial unit vectors are programmed by the developer via the Set Start Up Position line 342c of the Program Menu 329. The information stored on the lines 710 and 712 can be used by the computer 114 so that the computer 114 can correctly place and orient the observer vehicle containing the user 102 in the simulated universe 146 (FIG. 17) at the start of play of the scenario for a user 102.

The computer 114 stores the information about the programmed vehicles in a series of similar data structures 720, 724, 728. These data structures are further sorted in the memory of the computer 114 in terms of when the programmed vehicle is programmed to appear on the scenario in the simulated universe 146 according to the scenario clock.

The data structure 720 contains all the defining attributes of the first programmed vehicle, as well as a pointer to the location of the path data for this particular vehicle within the memory of the computer 114. The identification or Path ID number assigned to the first programmed vehicle is stored in area 720a of the data structure 720. This number is used by the computer 114 to retrieve information relating to the first programmed vehicle when the computer 114 is displaying this vehicle on the video display 122 (FIG. 1). A pursued or rabbit vehicle flag, or indicator, is stored in area 720b of the data structure 720. This indicator specifies that the first programmed vehicle is the rabbit vehicle 150 (FIG. 17) if the developer has defined the first programmed vehicle to be the rabbit vehicle 150 via the Define Rabbit Path Line 520h of the Edit Menu 510 (FIG. 14). An area 720c indicates when, on the scenario clock, the first programmed vehicle is scheduled to be introduced into the simulated universe 146, and an area 720d indicates when, on the scenario clock, the first programmed vehicle is scheduled to be taken out of the simulated universe 146. The data contained on the lines 720c and 720d is used by the computer 114 to determine when to display and remove the first programmed vehicle from the simulated universe 146 (see FIG. 4). An area 720e contains data which defines the type of vehicle the first programmed vehicle has been selected to be by the developer. This data is used by the computer 114 to generate a display of the first programmed vehicle within the simulated universe 146 via the video display 122 (FIG. 1). The data structure 720 further contains an area 720f which is a pointer to the location within the memory of the computer 114 of a data structure 722 containing the path data for the first programmed vehicle.

The path data for the first programmed vehicle contained in data structure 722 is arranged so that it contains the location of the first programmed vehicle within the simulated universe 146 (FIG. 17) at sequential intervals of time on the scenario clock. When the first programmed vehicle 640 is recorded by the computer 114 via the Add Vehicle line 642d of the Program Menu 329 (FIG. 8), the data structure 722 simultaneously receives the Cartesian coordinates of the first programmed vehicle from the model process 118 (FIG. 1), as well as the time according to the scenario clock 734. When the first programmed vehicle 640 (FIG. 17) is displayed by the computer 114 via the video display 122 (FIG. 1), the time on the scenario clock 734 tells the computer 14 the location where the first programmed vehicle should be displayed.

FIG. 18 further illustrates that there are similar data structures for each of the programmed vehicles and their paths through the simulated universe 146 in the memory of the computer 114 for this scenario. A data structure 724 contains the attributes of the second programmed vehicle scheduled to appear in the simulated universe 146, according to the scenario timer, with a pointer to a data structure 726 within the memory of the computer 114 which contains the path data for the second programmed vehicle. Additionally, a data structure 728 contains the attributes of the last programmed vehicle scheduled to appear in the simulated universe 146, according to the scenario clock 734, with a pointer to a data structure 730 in the memory of the computer 114 containing the path data for the last programmed vehicle.

FIG. 18 thus illustrates the data for a simulation scenario that is stored within the memory of the computer 114 during the course of either developing or playing the pursuit simulation scenario. Included in the Microfiche Appendix is the source code, entitled "svars.h" which defines the above-described data structures for this preferred embodiment of the present invention.

VI. SUMMARY

The present invention includes a simplified process of programming or developing scenario for vehicle simulators. Specifically, this invention permits a scenario developer to program the movements of a simulated vehicle in a simulated universe by manipulating the vehicle controls within the simulator and driving the vehicle in the simulated universe according to the user selectable parameters in the scenario such as initial position and initial time. One specific embodiment of the present invention includes the capability to program a simulation scenario which will train police officers how to pursue automobiles through suburban streets.

Although the above detailed description has shown, described and pointed out fundamental novel features of the invention as applied to the various embodiments discussed above, it will be understood that various omissions and substitutions and changes in the form and details of the device illustrated may be made by those skilled in the art, without departing form the spirit of the invention. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A vehicle simulation system for a user of a simulated vehicle, comprising:

a plurality of simulated input devices for controlling the operation of the simulated vehicle;

modeling means responsive to the input devices for determining position information of the simulated vehicle in a simulated environment;

a video display for presenting the user with a view of the simulated environment;

a memory;

a scenario clock;

scenario development means for developing a scenario that includes a plurality of programmed vehicles, wherein during development of the scenario the simulated input devices direct the movement of selected vehicles to be programmed in the simulated environment, and wherein the scenario development means records the position information of said selected vehicles to be programmed in the memory from first user selected initial positions at first user selected initial times on the scenario clock as part of the scenario; and means for replaying the scenario form the memory so that the scenario clock is incremented and so that the movement of the plurality of programmed vehicles are reproduced within the stimulated environment while a second user simultaneously directs the operation of the stimulated vehicle in the stimulated universe.

2. The vehicle simulation system of claim.1, wherein the simulated vehicle is a simulated automobile.

3. The vehicle simulation system of claim 1, wherein the scenario is a pursuit vehicle simulation scenario and one of the programmed vehicles is a pursued vehicle.

4. A method of developing a scenario for a vehicle simulation system, comprising the steps of:

displaying a simulated universe;

manipulating a plurality of input devices to generate signals indicative of movement of selected ones of a plurality of programmed vehicles within the simulated universe;

modeling the signals to determine the position information, including an initial position, of each of the selected ones of the plurality of programmed vehicles within the simulated universe;

selecting an initial time for each of the selected ones of the plurality of programmed vehicles in the simulated universe;

recording the position information of the selected ones of the plurality of programmed vehicles within the simulated universe over time starting from the initial positions and the initial times to thereby develop a scenario which includes the movement of the plurality of programmed vehicles; and simultaneously replaying the scenario while a user is manipulating the plurality of input devices to control the movement of a simulated vehicle in the simulated universe.

5. The vehicle simulation system of claim 1, wherein the scenario clock is programmed to variably increment based on the relative distance between the simulated vehicle controlled by the second user and a moving point in the simulated universe defined by the first user.

6. The vehicle simulation system of claim 5, wherein one of the plurality of programmed vehicles is designated a rabbit vehicle which comprises the moving point, and wherein the second user manipulates the plurality of simulated inputs to pursue the rabbit vehicle.

7. The vehicle simulation system of claim 6, wherein the plurality of programmed vehicles are recorded in the memory in terms of their position in the simulated universe at a given time on the scenario clock.

8. The vehicle simulation system of claim 7, wherein the scenario clock is variably incremented to substantially maintain a selected distance in the simulated universe between the simulated vehicle driven by the second user and the rabbit vehicle.

9. The vehicle simulation system of claim 1, wherein the plurality of programmed vehicles is comprised of vehicles of different types with different appearances when displayed on the display and wherein the first user can select a vehicle type by manipulating one or more of the user operated input devices.

10. The vehicle simulation system of claim 1, wherein the scenario development means replays the scenario as previously recorded to the first user while the first user is recording one of the plurality of programmed vehicles as part of the scenario.

11. The vehicle simulation system of claim 10, wherein the first user can replay the previously recorded scenario and freeze the previously recorded scenario at a particular time on the scenario clock.

12. The vehicle simulation system of claim 11, wherein the first user can direct the simulated vehicle to a selected initial position for a selected programmed vehicle, while the scenario is frozen, by manipulating the plurality of simulated input devices.

13. The vehicle simulation system of claim 12, wherein the scenario development means unfreezes the scenario in response to the first user manipulating one or more of the plurality of input devices thereby allowing the first user to direct the simulated vehicle along a selected path, to thereby record the position information of the selected programmed vehicle from the selected initial position, while the scenario development means simultaneously replays the scenario for the first user.

14. The vehicle simulation system of claim 1, wherein the scenario development means includes a timer and wherein the first user can manipulate the plurality of simulated input controls to direct the simulated vehicle along a selected path in the simulated universe and thereby determine the amount of time a programmed vehicle will take to travel along the selected path.

15. The vehicle simulation system of claim 1, wherein the scenario development means replays, in response to the first user manipulating one of the plurality of input devices, the previously programmed scenario so that the first user can view the scenario on the display from a birds eye view.

16. The vehicle simulation system of claim 1, wherein the scenario development means, in response to the first user manipulating one of the plurality of input devices, replays the previously programmed scenario so that the first user can view the scenario on the display from the perspective of the second user while the first user is simultaneously operating the plurality of simulated input devices to control the operation of the simulated vehicle in the simulated universe.

17. The vehicle simulation system of claim 16, wherein the first user can designate a time period on the scenario clock that is to be replayed by manipulating one of the plurality of simulated input devices.

18. The method of claim 4, further comprising the step of incrementing a scenario clock while simultaneously manipulating the plurality of input devices so that the position information of the plurality of programmed vehicles is recorded in terms of a position within the simulated universe at a given time on the scenario clock.

19. The method of claim 18, wherein the step of replaying the scenario for a user comprises incrementing the scenario clock and updating the plurality of programmed vehicles to their appropriate position.

20. The method of claim 19, further comprising the step of defining one of the plurality of programmed vehicles as a rabbit vehicle that the user is to follow when the scenario is replayed for the user.

21. The method of claim 20, wherein the scenario clock is variably incremented depending upon the relative distance between the user directed simulated vehicle and rabbit vehicle.

22. The method of claim 21, wherein the scenario clock is variably incremented to substantially maintain a fixed distance between the user directed simulated vehicle and the rabbit vehicle regardless of the speed of the user directed vehicle.

23. A vehicle simulation system comprising:
at least one user operated input device for controlling the operation of a simulated vehicle in a simulated universe and for providing input signals;
a controller which receives signals indicative of user manipulation of the at least one input device wherein the controller determines the position of the simulated vehicle in the simulated universe based on the signals indicative of user manipulation of the at least one input device;
a display, responsive to signals from the controller, which displays, based in part on the position of the simulated vehicle in the simulated universe, a view of the simulated universe and a scenario occurring within the simulated universe; and
a storage medium operably engaged with the controller and containing information defining the simulated universe and the scenario, wherein the scenario is to be replayed to a second user while said second user simultaneously controls a simulated vehicle in a simulated universe and wherein the scenario includes at least one programmed vehicle travelling in at least a portion of the simulated universe and wherein a first user develops the scenario by manipulating the at least one user operated input device so as to direct operation of the simulated vehicle vehicle in the simulated universe and wherein, during development of the scenario, said storage medium records the position information of the programmed vehicle such that during replay of the scenario, the simulated vehicle operates within the simulated universe in accordance with the recorded position information from a first user selected initial position and from a first user selected initial time.

24. The vehicle simulation system of claim 23, wherein the controller comprises a computer and the storage medium comprises a memory associated with the computer.

25. The vehicle simulation system of claim 23, further comprising a scenario play process associated with the controller which causes the controller to replay the scenario and display at least a portion of the scenario on the display while the second user simultaneously controls the operation of the simulated vehicle, defined as an observer vehicle, in the simulated universe using the at least one input device.

26. The vehicle simulation system of claim 25, wherein the simulated vehicle comprises a simulated automobile, the at least one user operated simulated input devices include a steering wheel, accelerator pedal, and brake pedal and the simulated universe includes a plurality of intersecting streets.

27. The vehicle simulation system of claim 23, further comprising a scenario clock that provides signals to the controller while the first user is developing the scenario and while the controller is inducing the scenario to be displayed to the second user.

28. The vehicle simulation system of claim 27, wherein the path of the programmed vehicle is recorded in the storage medium in terms of the position of the programmed vehicle in the simulated universe at a given time according to the scenario clock.

29. The vehicle simulation system of claim 28, wherein the controller, in response to the first user repeatedly directing the simulated vehicle on a plurality of paths in the simulated universe using the at least one user operated input device, develops and stores information in the storage medium defining a plurality of paths for a plurality of programmed vehicles in the simulated universe in terms of the position of the programmed vehicle in the simulated universe at a given time according to the scenario clock.

30. The vehicle simulation system of claim 29, wherein the controller replays the scenario which includes the plurality of programmed vehicles while the second user simultaneously directs a simulated vehicle in the simulated universe.

31. The vehicle simulation system of claim 30, wherein the plurality of programmed vehicles is comprised of vehicles of different types with different appearances when displayed on the display and wherein the first user can select the vehicle type by manipulating the at least one user operated input.

32. The vehicle simulation system of claim 30, wherein the controller designates one of the plurality of programmed vehicles as a rabbit vehicle in response to the first user manipulating one of the at least one input devices and wherein the second user pursues the rabbit vehicle through the simulated universe when the scenario play process replays the scenario.

33. The vehicle simulation system of claim 32, wherein the scenario clock is variably incremented while the scenario play process is replaying the scenario so that a pre-set distance is maintained between the rabbit vehicle and the observer vehicle while the second user pursues the rabbit vehicle.

34. The vehicle simulation system of claim 33, wherein the first user designates a starting location within the simulated universe for the second user by directing the simulated vehicle to the starting location using the at least one input device and then manipulating the at least one input device to cause the controller to record the current position in the simulated universe of the simulated vehicle at the starting location for the second user when the controller is replaying the scenario for the second user.

35. The vehicle simulation system of claim 23, further comprising a scenario clock and wherein the scenario includes a plurality of programmed vehicles travelling on a plurality of paths as programmed by the first user so that the plurality of programmed vehicles are at particular locations within the simulated universe at particular time intervals according to the scenario clock, and wherein the controller replays the scenario as previously recorded to the first user while the first user is recording one of the plurality of programmed vehicles.

36. The vehicle simulation system of claim 35, wherein the first user can replay the previously recorded scenario and freeze the previously recorded scenario at a particular time on the scenario clock by manipulating the at least one user input device.

37. The vehicle simulation system of claim 36, wherein the first user can drive the simulated vehicle to a selected initial position for a selected programmed vehicle, while the scenario is frozen, by manipulating the at least one user input device.

38. The vehicle simulation system of claim 37, wherein the first user can unfreeze the scenario and drive the simulated vehicle to thereby record the position information of the selected programmed vehicle from the selected initial position while the scenario is replayed for the first user.

39. A vehicle simulation system comprising:

at least one user operated input device for controlling the operation of a simulated vehicle in a simulated universe;

a controller;

a storage medium operably engaged with the controller and containing information defining the simulated universe and a scenario;

a model process associated with the controller and responsive to signals indicative of user manipulation of the at least one input device, for determining the position of the simulated vehicle in the simulated universe;

a scenario clock;

a display, responsive to signals from the controller, for displaying a view of the simulated universe based in part on the position of the simulated vehicle as determined by the model process;

a scenario development process, associated with the controller and responsive to signals from the model process, for developing and storing information in the storage medium defining a scenario, including a path of a programmed vehicle through at least a portion of the simulated universe, in response to a first user controlling operation of the simulated vehicle in the simulated universe using the at least one input device, wherein the path of the programmed vehicle is recorded in the storage medium in terms of a position in the simulated universe at a given time on the scenario clock; and a scenario replay process, associated with the controller, that replays the scenario for a second user while the second user simultaneously directs the simulated vehicle through the simulated universe, wherein the scenario replay process replays the scenario by variably updating the scenario clock, depending upon the relative positions within the simulated universe of the simulated vehicle controlled by the second user and a pre-defined moving point.

40. The vehicle simulation system of claim 39, wherein the first user defines the moving point by directing the simulated vehicle along a path in the simulated universe using the at least one user input and the scenario development process records the path as the path of the moving point in terms of a position in the simulated universe at a particular time on the scenario clock.

41. The vehicle simulation system of claim 40, wherein the second user follows a rabbit vehicle that corresponds to the moving point defined by the first user.

42. The vehicle simulation system of claim 41, wherein the scenario clock is updated so that a pre-selected distance between the rabbit vehicle and the simulated vehicle directed by the second user is substantially maintained.

43. A method of developing a vehicle scenario comprising the steps of:

displaying a simulated universe;

manipulating a plurality of input devices to generate signals indicative of movement of a simulated vehicle in the simulated universe;

recording the path of the simulated vehicle as a programmed vehicle, which comprises at least a portion of a scenario, in terms of the position within the simulated universe at a particular time on a scenario clock; and replaying the scenario by displaying the scenario to a second user, while the second user simultaneously manipulates a plurality of input devices to control the movement of a simulated vehicle in a simulated universe, wherein the scenario is replayed by variably incrementing the scenario clock depending upon the relative positions within the simulated universe of the simulated vehicle controlled by the second user and a pre-defined moving point.

44. The method of claim 43, wherein the recording step comprises the step of defining said moving point by producing a moving point designation and manipulating the plurality of input controls to direct a simulated vehicle along a path in the simulated universe to thereby define the path of the moving point.

45. The method of claim 44, wherein the replaying step further comprises replaying a rabbit vehicle that travels along a path at a position corresponding to that of the moving point and wherein the second user manipulates the plurality of input controls to direct the simulated vehicle to follow the rabbit vehicle.

46. The method of claim 45, wherein the scenario clock is updated to substantially maintain a pre-selected distance between the rabbit vehicle and the simulated vehicle controlled by the second user.

47. A vehicle simulation system comprising:

at least one user operated input device for controlling the operation of a simulated vehicle in a simulated universe and for providing input signals;

a controller which receives signals indicative of user manipulation of the at least one input device wherein the controller determines the position of the simulated vehicle in the simulated universe based on the signals indicative of user manipulation of the at least one input device;

a display, responsive to signals from the controller, which displays, based in part on the position of the simulated vehicle in the simulated universe, a view of the simulated universe and a scenario occurring within the simulated universe;

a scenario clock, responsive to signals from the controller, which increments while the scenario is being replayed on the display; and a storage medium operably engaged with the controller and containing information defining the simulated universe and the scenario, wherein the scenario is replayed to a user while the user simultaneously controls a simulated vehicle in a simulated universe and wherein the scenario includes at least one programmed vehicle travelling along a path in at least a portion of the simulated universe and wherein the position of the at least one programmed vehicle in the simulated universe is recorded in terms of a position in the simulated universe at a given time on the scenario clock and wherein the controller variably increments the scenario clock based on the relative position between the simulated vehicle controlled by the user and a pre-defined moving point in the simulated universe.

48. The vehicle simulation system of claim 47, wherein the position of the pre-defined moving point corresponds to the position of the programmed vehicle.

49. The vehicle simulation system of claim 47, further comprising a scenario development process wherein, during scenario development, a developer defines aspects of the scenario by directing the at least one programmed vehicle along a path in the simulated universe by manipulating the at least one user operated input device.

* * * * *